(12) United States Patent
Tylik et al.

(10) Patent No.: US 11,513,684 B1
(45) Date of Patent: Nov. 29, 2022

(54) DATA STORAGE SYSTEM MANAGEMENT TECHNIQUES AND METRICS

(71) Applicant: EMC IP Holding Company LLC, Hopkinton, MA (US)

(72) Inventors: Dmitry Tylik, Westborough, MA (US); Carole Ann Gelotti, Hollis, NH (US); Nagasimha G. Haravu, Apex, NC (US); Aharon Blitzer, Shoham (IL); Alexander Izikson, Gan Yavne (IL); Yuval Harduf, Yahud (IL); Alan L. Taylor, Cary, NC (US); Marina Shem Tov, Hod Hasharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/355,242

(22) Filed: Jun. 23, 2021

(51) Int. Cl.
*G06F 3/06* (2006.01)

(52) U.S. Cl.
CPC ............ *G06F 3/0604* (2013.01); *G06F 3/065* (2013.01); *G06F 3/0614* (2013.01); *G06F 3/0665* (2013.01); *G06F 3/0683* (2013.01)

(58) Field of Classification Search
CPC ...... G06F 3/0604; G06F 3/0614; G06F 3/065; G06F 3/0665; G06F 3/0683; G06F 11/14; G06F 11/1402; G06F 11/1443; G06F 11/1456; G06F 11/1466; G06F 11/16; G06F 11/1666; G06F 11/2053; G06F 11/2056; G06F 11/2094

See application file for complete search history.

(56) References Cited

U.S. PATENT DOCUMENTS

| 9,619,171 | B2 * | 4/2017 | Nakagawa | .......... G06F 11/2074 |
| 2008/0104347 | A1 * | 5/2008 | Iwamura | ............... G06F 3/0619 |
| | | | | 711/E12.103 |

(Continued)

OTHER PUBLICATIONS

A. K. Pandey, A. Kumar, N. Malviya and B. Rajendran, "A Survey of Storage Remote Replication Software," 2014 3rd International Conference on Eco-friendly Computing and Communication Systems, 2014, pp. 45-50, doi: 10.1109/Eco-friendly.2014.85. (Year: 2014).*

(Continued)

*Primary Examiner* — Khoa D Doan
(74) *Attorney, Agent, or Firm* — Muirhead and Saturnelli, LLC

(57) ABSTRACT

Data storage management may include configuring a stretched volume in a metro cluster configuration using a first volume and a second volume both configured as a same logical volume, L1; receiving I/O operations at the metro cluster configuration directed to L1, wherein the I/O operations include a write operations that are received at a first system of the metro cluster configuration and that write first data to the first volume; viewing values of a metric regarding data replication performed for the first volume to replicate data between systems of the metro cluster configuration for writes directed to the first volume; responsive to said viewing, determining whether the first metric values denote a problem has occurred in the metro cluster configuration at a first point in time; and responsive to determining that the problem has occurred at the first point in time, performing one or more corrective actions.

17 Claims, 13 Drawing Sheets

(56) References Cited

U.S. PATENT DOCUMENTS

2013/0086349 A1* 4/2013 Kaiya ................ G06F 3/0619
711/164
2020/0097180 A1* 3/2020 Hironaka ............ G06F 3/0619

OTHER PUBLICATIONS

N. G. Bachiega, P. S. L. de Souza, S. M. Bruschi and S. d. R. S. de Souza, "Performance Evaluation of Container's Shared Volumes," 2020 IEEE International Conference on Software Testing, Verification and Validation Workshops (ICSTW), 2020, pp. 114-123, doi: 10.1109/ICSTW50294.2020.00031. (Year: 2020).*

* cited by examiner

US 11,513,684 B1

DATA STORAGE SYSTEM MANAGEMENT TECHNIQUES AND METRICS

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for performing data storage management comprising: configuring a stretched volume in a metro cluster configuration including a first data storage system, DS1, and a second data storage system, DS2, wherein the stretched volume is configured using a first volume, V1, on DS1 and a second volume, V2, on DS2, wherein V1 and V2 are configured as a same logical volume, L1, and exposed to a host as the same logical volume, L1, over a plurality of paths including a first path, P1, and a second path, P2, wherein P1 is between the host and DS1, and wherein P2 is between the host and DS2; receiving a plurality of I/O operations at the metro cluster configuration directed to the same logical volume L1, wherein the plurality of I/O operations includes a first plurality of write operations that are received at DS1 and that write first data to V1; viewing values of a first metric regarding data replication performed for V1 at a plurality of points in time, wherein the data replication is from DS1 to DS2 to replicate the first data written by the first plurality of write operations whereby the replicated first data is subsequently written to V2 on DS2; responsive to said viewing, determining whether one or more of the values of the first metric denote that a problem has occurred in the metro cluster configuration at a first of the plurality of points in time; and responsive to determining that the problem has occurred at the first point in time, performing one or more corrective actions.

In at least one embodiment, the first metric may be an average mirroring overhead latency for V1 indicating latency experienced when performing the data replication that replicates writes directed to V1 from DS1 to DS2.

In at least one embodiment, the first metric may be a mirrored write I/O rate denoting a number of write I/O operations in a specified unit of time for write I/Os that are directed to V1 and replicated from DS1 to DS2.

In at least one embodiment, the first metric may be an average mirrored write I/O bandwidth denoting an I/O bandwidth for write data transmitted when replicating write I/Os directed to V1 from DS1 to DS2.

In at least one embodiment, responsive to determining that the one or more values for the first metric indicate that write data directed to V1 is not being replicated from DS1 to DS2 at corresponding points in time, it may be determined that the problem that has occurred at the first point in time is replication failure when replicating write data directed to V1 from DS1 to DS2 since, at the first point in time, V1 is stretched and included in a configuration for the stretched volume. The one or more corrective actions performed in response to determining that the problem is replication failure where write data directed to V1 is not being replicated from DS1 to DS2 may include one or more of: placing DS2 back online, rebooting DS2, and fixing or replacing a failed link used for replicating data from DS1 to DS2.

In at least one embodiment, at the first point in time, V1 may be configured as an unstretched or local resource and not included in the configuration of the stretched volume. Responsive to determining that the one or more values for the first metric indicate that write data directed to V1 is not being replicated from DS1 to DS2 at corresponding points in time, it may be determined that the one or more values of the first metric are due to a valid configuration change and do not denote an occurrence of the problem in the metro cluster configuration since, at the first point in time, V1 is unstretched and not included in the configuration for the stretched volume. V1 and V2 may be configured for synchronous data replication, wherein the data replication performed for V1 at the plurality of points in time is synchronous data replication, and wherein the first metric is regarding synchronous data replication performed for V1.

Various embodiments of the techniques herein may include a method, a system and a computer readable medium for performing data storage management comprising: configuring a plurality of stretched volumes in a metro cluster configuration including a first data storage system, DS1, and a second data storage system, DS2, wherein each stretched volume of the plurality of stretched volumes is configured using a corresponding one of a plurality of volume pairs, wherein each of the plurality of volume pairs for one of the plurality of stretched volumes is configured as one of a plurality of logical volumes, wherein said each volume pair includes a first volume, V1, on DS1 and a second volume, V2, on DS2, wherein V1 and V2 are configured as said one logical volume, and exposed to a host as said one logical volume, over a plurality of paths including a first path, P1, and a second path, P2, wherein P1 is between the host and DS1, and wherein P2 is between the host and DS2; receiving a plurality of I/O operations at the metro cluster configuration directed to the plurality of stretched volumes; viewing values of a first metric regarding data replication performed for the plurality of stretched volumes at a plurality of points in time, wherein the data replication is between DS1 and DS2 to replicate write data directed to the plurality of stretched volumes; responsive to said viewing, determining whether one or more of the values of the first metric denote that a problem has occurred in the metro cluster configuration at a first of the plurality of points in time; and responsive to determining that the problem has occurred at the first point in time, performing one or more corrective actions.

In at least one embodiment, the first metric may be at a node level for a first node of one of DS1 and DS2, and wherein the first metric may be determined in accordance with I/O operations received only at the first node.

In at least one embodiment, the first metric may be at an appliance level or a storage cluster level for a selected one of DS1 and DS2, and wherein the first metric may be determined in accordance with I/O operations received only at the selected one of DS1 and DS2.

In at least one embodiment, the first metric may be at a metro cluster level, and wherein the first metric may be determined in accordance with I/O operations received by both DS1 and DS2.

In at least one embodiment, the first metric may be an average mirroring overhead latency for the plurality of stretched volumes indicating latency experienced when performing the data replication that replicates writes directed to the plurality of stretched volumes from DS1 to DS2.

In at least one embodiment, the first metric may be a mirrored write I/O rate denoting a number of write I/O operations in a specified unit of time for write I/Os that are directed to the plurality of stretched volumes and replicated from DS1 to DS2.

In at least one embodiment, the first metric may be an average mirrored write I/O bandwidth denoting an I/O bandwidth for write data transmitted when replicating write I/Os, that are directed to the plurality of stretched volumes, from DS1 to DS2.

In at least one embodiment, the first metric may be an average mirrored write I/O latency for write I/Os that are directed to the plurality of stretched volumes and are replicated from DS1 to DS2.

In at least one embodiment, responsive to determining that the one or more values for the first metric indicate that write data is not being replicated from DS1 to DS2 at corresponding points in time, it may be determined that the problem that has occurred at the first point in time is replication failure when replicating write data directed from DS1 to DS2 since, at the first point in time, the plurality of stretched volumes are configured. The one or more corrective actions performed in response to determining that the problem is replication failure where write data is not being replicated from DS1 to DS2 may include one or more of: placing DS2 back online, rebooting DS2, and fixing or replacing a failed link used for replicating data from DS1 to DS2.

In at least one embodiment, responsive to determining that the one or more values for the first metric indicate that write data is not being replicated from DS1 to DS2 at corresponding points in time, determining that the one or more values of the first metric are due to a valid configuration change and do not denote an occurrence of the problem in the metro cluster configuration since, at the first point in time, there are no stretched volumes in the metro cluster configuration.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
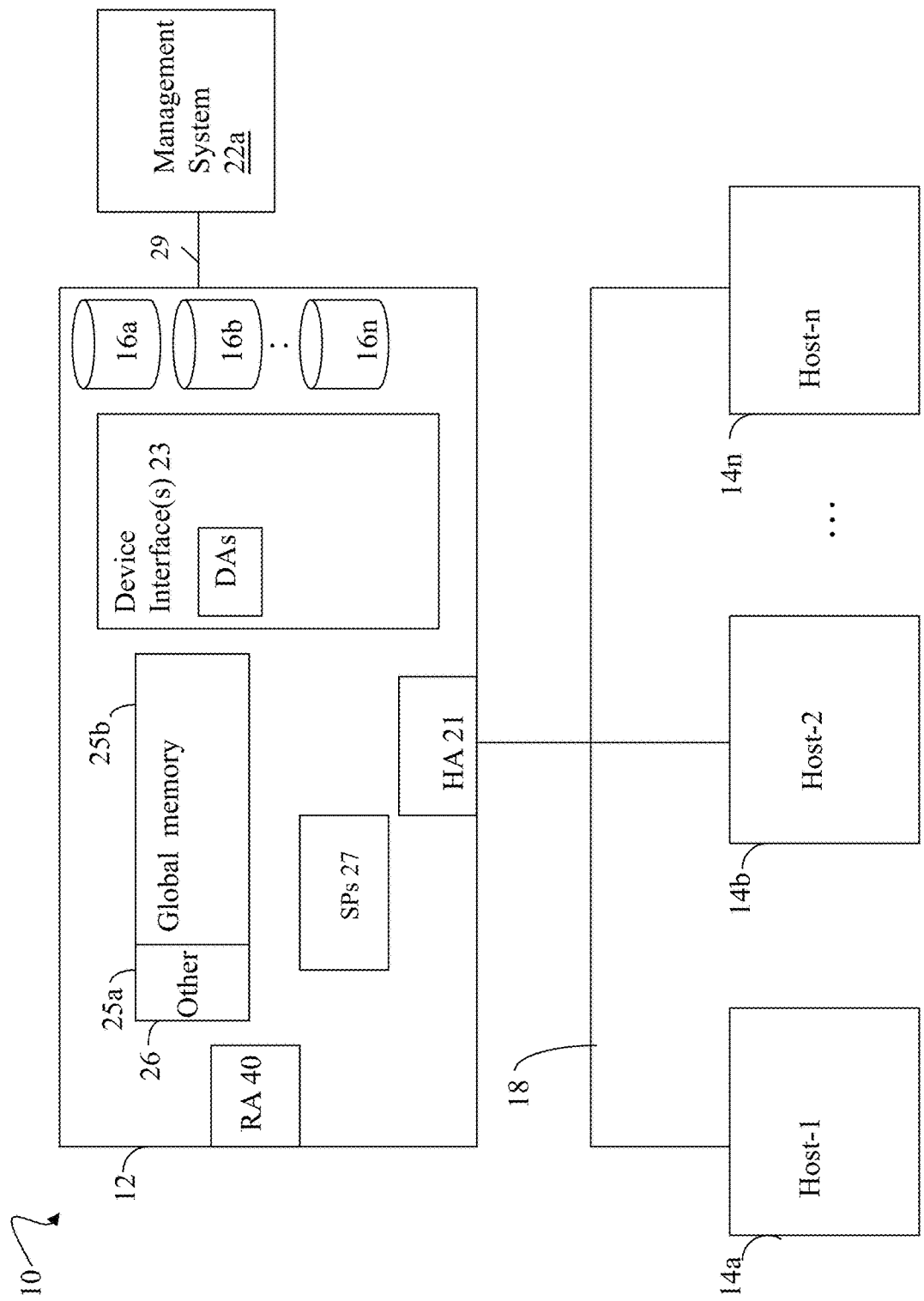
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
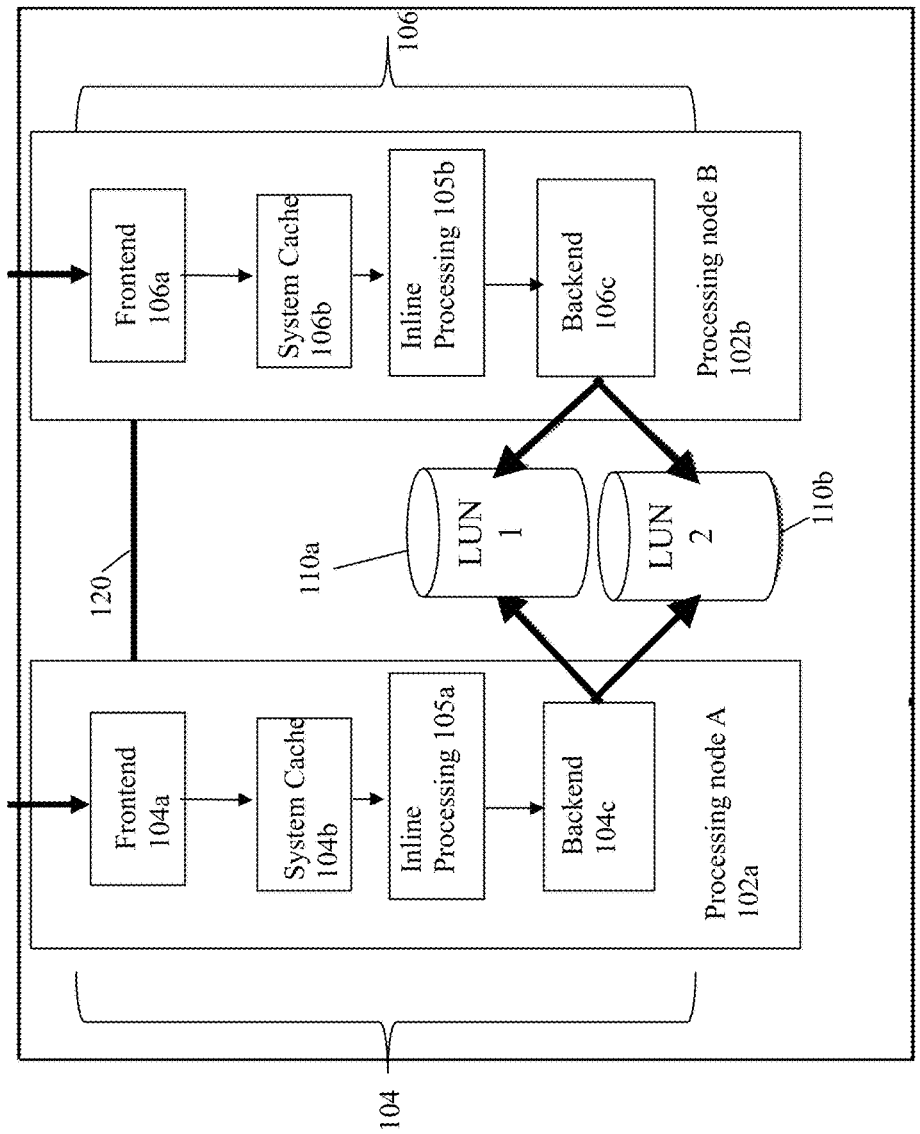
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing storage cluster or federation to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

Data replication is one of the data services that may be performed on a data storage system in an embodiment in accordance with the techniques herein. In at least one data storage system, remote replication is one technique that may be used in connection with providing for disaster recovery (DR) of an application's data set. The application, such as executing on a host, may write to a production or primary data set of one or more LUNs on a primary data storage system. Remote replication may be used to remotely replicate the primary data set of LUNs to a second remote data storage system. In the event that the primary data set on the primary data storage system is destroyed or more generally unavailable for use by the application, the replicated copy of the data set on the second remote data storage system may be utilized by the host. For example, the host may directly access the copy of the data set on the second remote system. As an alternative, the primary data set of the primary data storage system may be restored using the replicated copy of the data set, whereby the host may subsequently access the restored data set on the primary data storage system. A remote data replication service or facility may provide for automatically replicating data of the primary data set on a first data storage system to a second remote data storage system in an ongoing manner in accordance with a particular replication mode, such as a synchronous mode described elsewhere herein.

Figure 3:
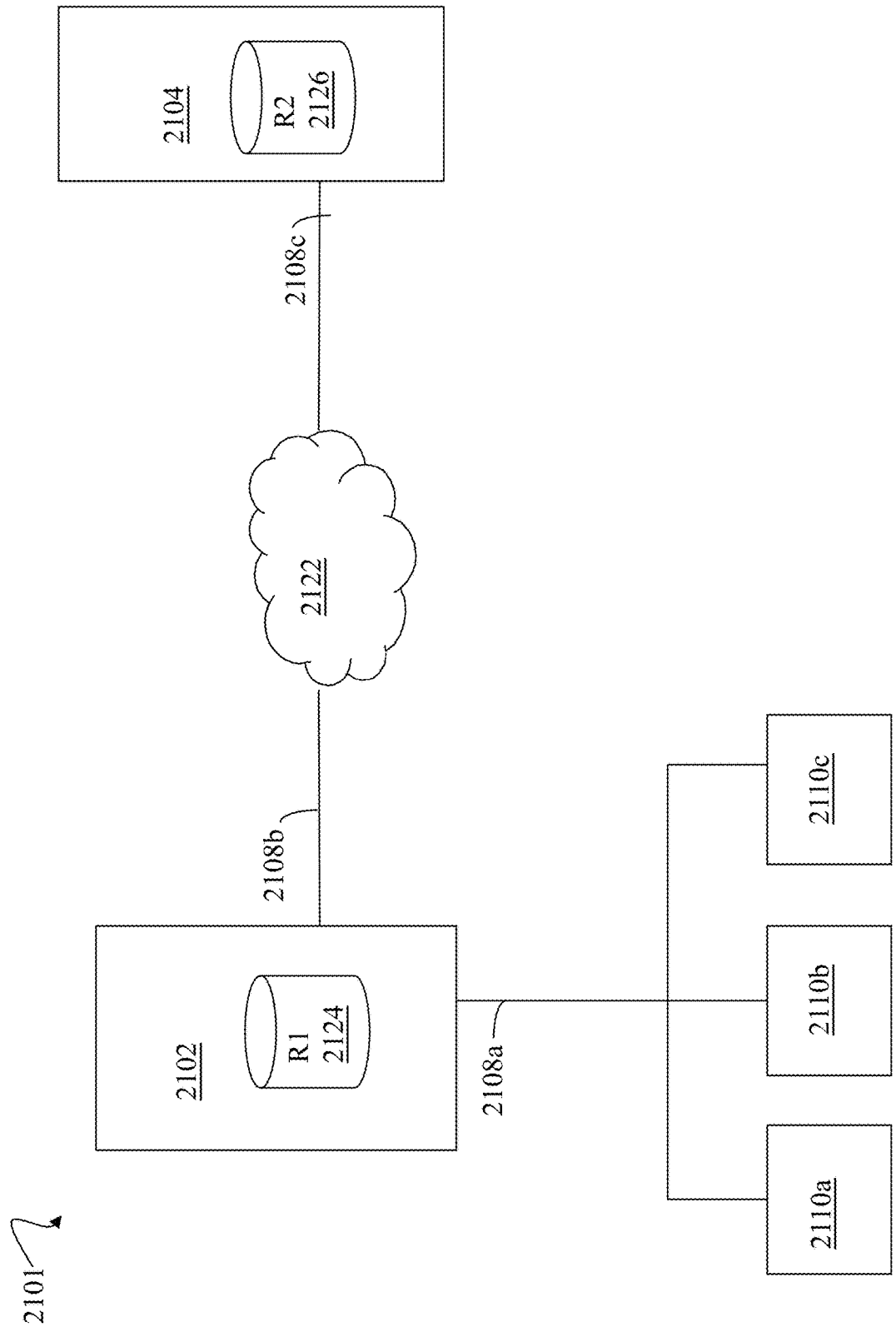
FIG. 3 is an example of systems that may be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 may be remotely connected and communicate over the network 2122, such as the Internet or other private network, and facilitate communications with the components connected thereto. The hosts 2110a, 2110b and 2110c may perform operations to the data storage system 2102 over the connection 2108a. The hosts 2110a, 2110b and 2110c may be connected to the data storage system 2102 through the connection 2108a which may be, for example, a network or other type of communication connection.

The data storage systems 2102 and 2104 may include one or more devices. In this example, the data storage system 2102 includes the storage device R1 2124, and the data storage system 104 includes the storage device R2 2126. Both of the data storage systems 2102, 2104 may include one or more other logical and/or physical devices. The data storage system 2102 may be characterized as local with respect to the hosts 2110a, 2110b and 2110c. The data storage system 104 may be characterized as remote with respect to the hosts 2110a, 2110b and 2110c. The R1 and R2 devices may be configured as LUNs.

The host 1210a may issue a command, such as to write data to the device R1 of the data storage system 2102. In some instances, it may be desirable to copy data from the storage device R1 to another second storage device, such as R2, provided in a different location so that if a disaster occurs that renders R1 inoperable, the host (or another host) may resume operation using the data of R2. With remote replication, a user may denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 110a may read and write data using the R1 volume in 2102, and the RRF may handle the automatic copying and updating of data from R1 to R2 in the data storage system 2104. Communications between the storage systems 2102 and 2104 may be made over connections 2108b, 2108c to the network 2122.

A RRF may be configured to operate in one or more different supported replication modes. For example, such modes may include synchronous mode and asynchronous mode, and possibly other supported modes. When operating in the synchronous mode, the host does not consider a write I/O operation to be complete until the write I/O has been completed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

With synchronous mode remote data replication, a host 2110a may issue a write to the R1 device 2124. The primary or R1 data storage system 2102 may store the write data in its cache at a cache location and mark the cache location as including write pending (WP) data as mentioned elsewhere herein. The RRF operating in the synchronous mode may propagate the write data across an established connection or link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

Figure 4:
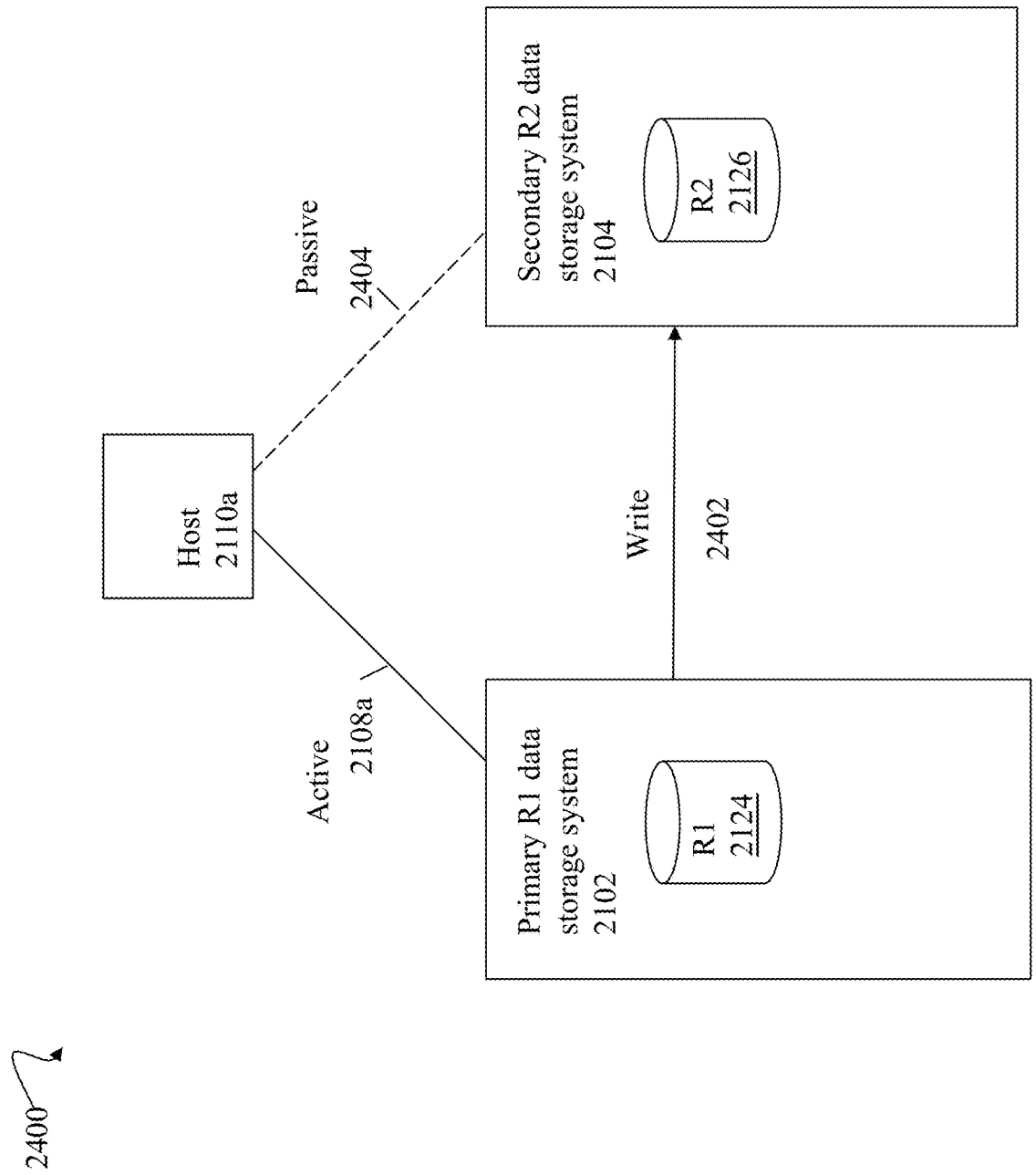
FIG. 4 is an example illustrating an active-passive replication arrangement.

With reference to FIG. 4, shown is a further simplified illustration of components that may be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, may also be used in connection with other information and communications exchanged between the systems 2101 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 may also be referred to herein as an active-passive configuration such as may be used with synchronous replication and other supported replication modes where the host 2110a has an active connection or path 2108a over which all I/Os are issued to only the R1 data storage system. The host 2110a may have a passive connection or path 2404 to the R2 data storage system 2104.

In the configuration of 2400, the R1 device 2124 and R2 device 2126 may be configured and identified as the same LUN, such as LUN A, to the host 2110a. Thus, the host 2110a may view 2108a and 2404 as two paths to the same LUN A, where path 2108a is active (over which I/Os may be issued to LUN A) and where path 2404 is passive (over which no I/Os to the LUN A may be issued). For example, the devices 2124 and 2126 may be configured to have the same logical device identifier such as the same world wide name (WWN) or other identifier as well as having other attributes or properties that are the same. Should the connection 2108a and/or the R1 data storage system 2102 experience a failure or disaster whereby access to R1 2124 configured as LUN A is unavailable, processing may be performed on the host 2110a to modify the state of path 2404 to active and commence issuing I/Os to the R2 device configured as LUN A. In this manner, the R2 device 2126 configured as LUN A may be used as a backup accessible to the host 2110a for servicing I/Os upon failure of the R1 device 2124 configured as LUN A.

The pair of devices or volumes including the R1 device 2124 and the R2 device 2126 may be configured as the same single volume or LUN, such as LUN A. In connection with discussion herein, the LUN A configured and exposed to the host may also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110a, the same LUN A is exposed over the two paths 2108a and 2404.

It should be noted although only a single replication link 2402 is illustrated, more generally any number of replication links may be used in connection with replicating data from systems 2102 to system 2104.

Figure 5:
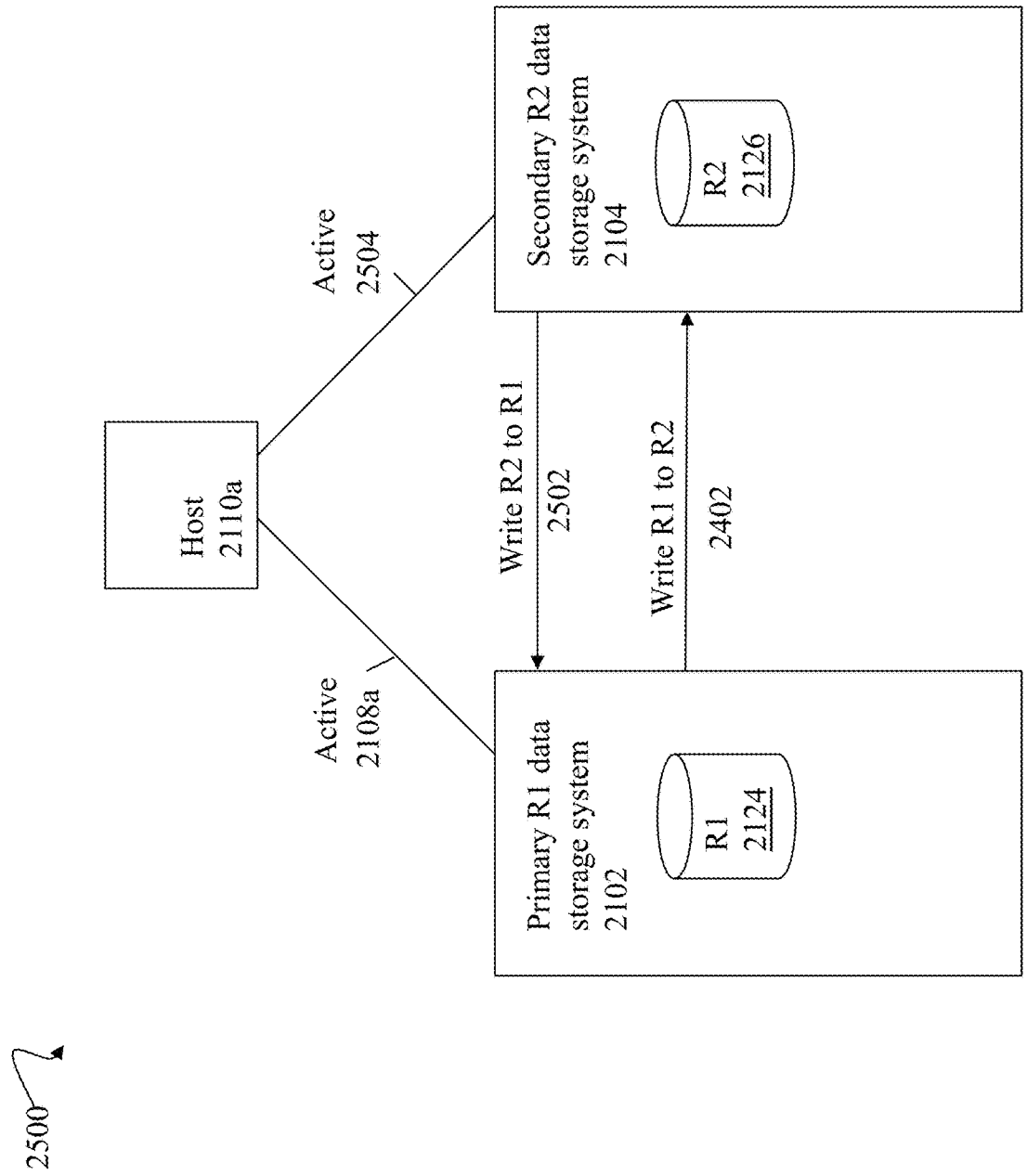
FIG. 5 is an example illustrating an active-active arrangement with a stretched volume in an embodiment in accordance with the techniques herein.

Referring to FIG. 5, shown is an example configuration of components that may be used in an embodiment in accordance with the techniques herein. The example 2500 illustrates an active-active configuration as may be used in connection with synchronous replication in at least one embodiment in accordance with the techniques herein. In the active-active configuration with synchronous replication, the host 2110a may have a first active path 2108a to the R1 data storage system and R1 device 2124 configured as LUN A. Additionally, the host 2110a may have a second active path 2504 to the R2 data storage system and the R2 device 2126 configured as the same LUN A. From the view of the host 2110a, the paths 2108a and 2504 appear as 2 paths to the same LUN A as described in connection with FIG. 4 with the difference that the host in the example 2500 configuration may issue I/Os, both reads and/or writes, over both of the paths 2108a and 2504 at the same time. The host 2110a may send a first write over the path 2108a which is received by the R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110a over the path 2108a, where the acknowledgement indicates to the host that the first write has completed.

The host 2110a may also send a second write over the path 2504 which is received by the R2 system 2104 and written to the cache of the R2 system 2104 where, at a later point in time, the second write is destaged from the cache of the R2 system 2104 to physical storage provisioned for the R2 device 2126 configured as the LUN A. The R2 system 2104 also sends the second write to the R1 system 2102 over a second link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the R1 system 2102, the R1 system 2102 sends an acknowledgement over the link 2502 to the R2 system 2104 that it has completed the second write. Once the R2 system 2104 receives the acknowledgement from the R1 system (regarding completion of the second write), the R2 system 2104 then returns an acknowledgement to the host 2110a over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110a, the same stretched LUN A is exposed over the two active paths 2504 and 2108a.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108a to the system 2102 is stored on the R1 device 2124 and also transmitted to the system 2104 over 2402. The write sent over 2402 to system 2104 is stored on the R2 device 2126. Such replication is performed synchronously in that the received host write sent over 2108a to the data storage system 2102 is not acknowledged as successfully completed to the host 2110a unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that although FIG. 5 illustrates for simplicity a single host accessing both the R1 device 2124 and R2 device 2126, any number of hosts may access one or both of the R1 device 2124 and the R2 device 2126.

Although only a single link 2402 is illustrated in connection with replicating data from systems 2102 to system 2104 in connection with the techniques herein, more generally any number of links may be used. Although only a single link 2502 is illustrated in connection with replicating data from systems 2104 to system 2102, more generally any number of links may be used. Furthermore, although 2 links 2402 and 2502 are illustrated, in at least one embodiment, a single link may be used in connection with sending data from system 2102 to 2104, and also from 2104 to 2102.

FIG. 5 illustrates an active-active remote replication configuration for the stretched LUN A. The stretched LUN A is exposed to the host by having each volume or device of the device pair (R1 device 2124, R2 device 2126) configured and presented to the host as the same volume or LUN A. Additionally, the stretched LUN A is configured for two way synchronous remote replication between the two devices or volumes of the device pair.

In an embodiment described herein, the data storage system may be a SCSI-based system such as SCSI-based data storage array. An embodiment in accordance with the techniques herein may include hosts and data storage systems which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a LUN's access state with respect to a particular initiator port and the target port. Thus, in accordance with the ALUA standard, various access states may be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN). A recognized path (such as recognized by a host as a result of discovery processing) over which I/Os (e.g., read and write I/Os) may be issued to access data of a LUN may have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a preferred path state for the particular LUN. A path for a particular LUN having the active-non optimized (or unoptimized) path state may also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host may select to send I/Os to a LUN from those paths having an active-optimized state for the LUN. The host may proceed to use a path having an active non-optimized state for the LUN only if there is no active-optimized path for the LUN. A recognized path over which I/Os may not be issued to access data of a LUN may have an "unavailable" state. When a path to a LUN is in the unavailable state, a limited set of non-I/O-based commands (e.g. other than read and write commands to, respectively, read and write user data), such as the SCSI INQUIRY, may be issued. It should be noted that such limited set of non I/O based commands may also be issued over an active (e.g., active optimized and active non-optimized) path as well.

Figure 6:
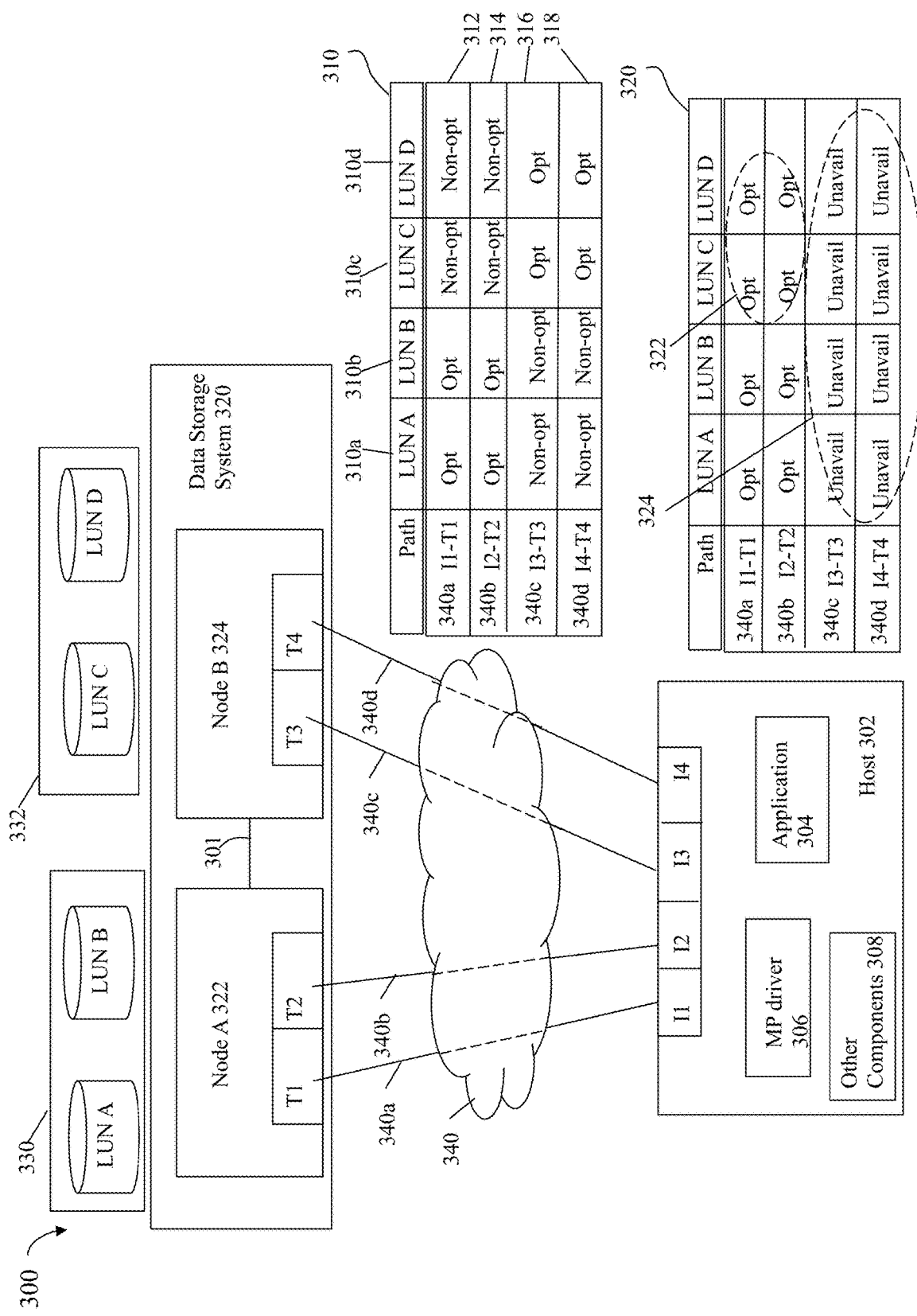
FIG. 6 is an example illustrating path states for paths between a host and a data storage system that may be used in an embodiment in accordance with the techniques herein.

Referring to FIG. 6, shown is an example of an embodiment of a system that may be utilized in connection with the techniques herein. The example 300 includes a host 302, a network 340 and a data storage system 320. The host 302 and the data storage system 320 may communicate over one or more paths 340a-d through the network 340. The paths 340a-d are described in more detail below. The LUNs A and B are included in the set 330, and the LUNs C and D are included in the set 332. The LUNs of the sets 330 and 332 are configured from non-volatile BE storage PDs of the data storage system 320. The data storage system includes two nodes—node A 322 and node B 324. The nodes 322, 324 may be as described elsewhere herein. The element 301 denotes an internode communication connection similar, for example, to the connection 120 of FIG. 2. Consistent with other discussion herein such as in connection with FIG. 2, the BE PDs from which storage is provisioned for the LUNs of 330, 332 are accessible to both the nodes 322, 324.

The host 202 may include an application 304, a multi-path (MP) driver 306 and other components 308. The other components 308 may include, for example, one or more other device drivers, an operating system, and other code and components of the host. An I/O operation from the application 304 may be communicated to the data storage system 320 using the MP driver 306 and one or more other components of the data path or I/O path. The application 304 may be a database or other application which issues data operations, such as I/O operations, to the data storage system 320. Each of the I/O operations may be directed to a LUN, such as one of the LUNs of 330, 332, configured to be accessible to the host 302 over multiple physical paths. As such, each of the I/O operations may be forwarded from the application 304 to the data storage system 320 over one of the possible multiple paths.

The MP driver 306 may include functionality to perform any one or more different types of processing such as related to multipathing. For example, the MP driver 306 may include multipathing functionality for management and use of multiple paths. For example, the MP driver 306 may perform path selection to select one of the possible multiple paths based on one or more criteria such as load balancing to distribute I/O requests for the target device across available active-optimized or preferred paths. Host side load balancing may be performed by the MP driver to provide for better resource utilization and increased performance of the host, data storage system, and network or other connection infrastructure. The host 302 may also include other components 308 such as one or more other layers of software used in connection with communicating the I/O operation from the host to the data storage system 120. For example, element 108 may include Fibre Channel (FC), SCSI and NVMe (Non-Volatile Memory Express) drivers, a logical volume manager (LVM), and the like. It should be noted that element 308 may include software or other components used when sending an I/O operation from the application 304 where such components include those invoked in the call stack of the data path above the MP driver 306 and also below the MP driver 306. For example, application 304 may issue an I/O operation which is communicated in the call stack including an LVM, the MP driver 306, and a SCSI driver.

The data storage system 320 may include one or more BE PDs configured to store data of one or more LUNs. Each of the LUNs 330, 332 may be configured to be accessible to the host 302 through multiple paths. The node A 322 in this example has two data storage system target ports T1 and T2. The node B 324 in this example has two data storage system target ports T3 and T4. The host 302 includes 4 host initiator ports I1, I2, I3 and I4. The path 340a is formed using the endpoints I1 and T1 and may be denoted as I1-T1. The path 340b is formed using the endpoints I2 and T2 and may be denoted as I2-T2. The path 340c is formed using the endpoints I3 and T3 and may be denoted as I3-T3. The path 340d is formed using the endpoints I4 and T4 and may be denoted as I4-T4.

In this example, all of the LUNs A, B C and D may be accessible or exposed over all the data storage system target ports T1, T2, T3 and T4 over the paths 340a-d. As described in more detail below, a first set of paths to the node A 322 may be specified as active-optimized or preferred for the LUNs of the set 330 and a second set of paths to the node B 324 may be specified as active-optimized or preferred for the LUNs of the set 332. Additionally the first set of paths to the node A 322 may be specified as active-non optimized or non-preferred for the LUNs of the set 332 and the second set of paths to the node B 324 may be specified as active-non optimized or non-preferred for the LUNs of the set 330.

The multiple active paths allow the application I/Os to the LUNs A, B C and D to be routed over the multiple paths 340a-d and, more generally, allow the LUNs A, B C and D to be accessed over the multiple paths 340a-d. In the event that there is a component failure in one of the active-optimized multiple paths for a particular LUN, application I/Os directed to the particular LUN can be easily routed over other alternate preferred paths unaffected by the component failure. Additionally, in the event there are no preferred paths available for issuing I/Os to the particular LUN, non-preferred paths for the particular LUN may be used to send the I/Os to the particular LUN. Thus, an embodiment of the MP driver 306 may also perform other processing in addition to load balancing in connection with path selection. The MP driver 306 may be aware of, and may monitor, all paths between the host and the LUNs A, B C and D in order to determine that particular state of such paths with respect to the various LUNs. In this manner, the MP driver may determine which of the multiple paths over which a LUN is visible may be used for issuing I/O operations successfully. Additionally, the MP driver may use such information to select a path for host-data storage system communications issued to the particular LUN.

In the example 300, each of the LUNs A, B C and D may be exposed through the 4 paths 340a-d. As described in more detail below, each of the paths 340a-d may have an associated ALUA state also used by the host when issuing I/O operations. Each path 340a-d may be represented by two path endpoints—a first endpoint on the host 302 and a second endpoint on the data storage system 320. The first endpoint may correspond to a port of a host component, such as a host bus adapter (HBA) of the host 302, and the second endpoint may correspond to a target port of a data storage system component, such as a target port of a node of the data storage system 320. In the example 300, the elements I1, I2, I3 and I4 each denote a port of the host 302 (e.g. such as a port of an HBA), and the elements T1, T2 T3 and T4 each denote a target port of a node of the data storage system 320.

The MP driver 306, as well as other components of the host 302, may execute in kernel mode or other privileged execution mode. In one embodiment using a Unix-based operating system, the MP driver 306 may execute in kernel mode. In contrast, the application 304 may typically execute in user mode, or more generally, a non-privileged execution mode.

Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, the application 304 may issue one or more I/O operations (e.g., read and write commands or operations) directed to the LUNs 330, 332 of the data storage system. Such I/O operations from the application 304 may be directed to the MP driver 306 after passing through any intervening layers of the data or I/O path.

In connection with the SCSI standard, a path may be defined between two ports as described above. A command may be sent from the host (as well as a component thereof such as a HBA) and may be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path may be between a first endpoint which is an initiator port (e.g., I1) of the host and a second endpoint (e.g., T1) which is a target port of node in the data storage system. Over each such path, one or more LUNs may be visible or exposed to the host initiator through the target port of the data storage system.

In connection with some protocols such as the SCSI protocol, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a LBA within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In an embodiment described herein, the data storage system 320 may be a SCSI-based system such as SCSI-based data storage array operating in accordance with the ALUA standard. As described herein, a data storage system in accordance with the techniques herein may set an access path state for a particular LUN over a particular path from an initiator to a target of the data storage system. For example, the data storage system may set an access path state for a particular LUN on a particular path to active-optimized (also referred to herein as simply "optimized" or "preferred") to denote the path as a preferred path for sending I/Os directed to the LUN. The data storage system may set an access path state for a particular LUN on a particular path to active-non optimized (also referred to herein as simply "non-optimized" or "non-preferred") to denote a non-preferred path for sending I/Os directed to the LUN sent. The data storage system may also set the access path state for a particular LUN on a particular path to other suitable access states. Although discussion herein may refer to the data storage system setting and modifying the path access states of the paths between the host and the data storage system, in some embodiments, a host may also set and/or modify the path access states which are then communicated to the data storage system.

In accordance with the techniques herein, the data storage system may set the path state for a particular LUN to preferred or non-preferred for any suitable purpose. In at least one embodiment, multipathing software, such as the MP driver, on the host may monitor the particular access path state as may be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system may vary the associated access state of each such path in order to vary and control the particular ones of the multiple paths over which the host may issue I/Os to the LUN.

The element 330 indicates that the LUN A and the LUN B are exposed to the host 302 over preferred paths to the node A 322 and non-preferred paths to the node B 324. The element 332 indicates that the LUN C and the LUN D are exposed to the host 302 over preferred paths to the node B 324 and non-preferred paths to the node A 322. Thus, the paths 340c-d to the target ports T3 and T4 of node B 324 are set to optimized or preferred for the LUNs C and D and set to non-optimized or non-preferred for the remaining LUNs A and B; and the paths 340a-b to the target ports T1 and T2 of node A 322 are set to preferred or optimized for the LUNs A and B and set to non-optimized or non-preferred for the remaining LUNs C and D.

In at least one embodiment, target ports are given identifiers and may be organized into target port groups (TPGs).

In at least one embodiment, a TPG may be defined as a logical grouping or collection of one or more target port identifiers that share the same access characteristics for a particular LUN. For example, target ports T1 and T2 may be included in a first TPG and target ports T3 and T4 may be included in a second TPG. With ALUA in at least one embodiment, a LUN may be visible with respect to the entire TPG rather than on a port level basis. In other words, a LUN may be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g. with respect to all target ports of a TPG). Thus the LUN has the same path state or access characteristic with respect to all target ports of the same TPG. For example, the first TPG noted above may include all target ports of one of the nodes such as node A 322 over which the LUNs A, B, C and D are exposed; and the second TPG noted above may include all target ports of one of the nodes such as node B 324 over which the LUNs A, B, C and D are exposed.

The table 310 denotes the different path states for each of the 4 paths for the 4 LUNs A, B, C and D. The table 310 reflects the path states as discussed above. The row 312 indicates that path I1-T1 including the target port T1 of node A 322 is active optimized (opt) or preferred for the LUNs A and B and active non-optimized (non-opt) or non-preferred for the LUNs C and D. The row 314 indicates that path I2-T2 including the target port T2 of node A 322 is optimized (opt) or preferred for the LUNs A and B and non-optimized (non-opt) or non-preferred for the LUNs C and D. The row 316 indicates that path I3-T3 including the target port T3 of node B 324 is optimized (opt) or preferred for the LUNs C and D and non-optimized (non-opt) or non-preferred for the LUNs A and B. The row 318 indicates that path I4-T4 including the target port T4 of node B 324 is optimized (opt) or preferred for the LUNs C and D and non-optimized (non-opt) or non-preferred for the LUNs A and B.

Assume further, for example, the node B 324 of the data storage system 320 now experiences a failure so that the target ports T3 and T4 and thus the paths 340c, 340d are unavailable. In response to the failure of the node B 324 and the target ports T3 and T4, the path states may be updated from the states of the table 310 to the revised path states of the table 320. In the table 320, due to the failure and unavailability of the paths 340c-d, 1) the path states of 322 indicate that the path 340a I1-T1 and the path 340b I2-T2 have transitioned from the non-optimized to the optimized or preferred path state for the LUNs C and D; and 2) the path states of 324 indicate that the path I3-T3 340c and the path 340d I4-T4 for the LUNs A, B, C and D have transitioned to the unavailable state.

It is noted that other embodiments may have different path state changes than as denoted by the table 320.

A metro cluster configuration may be used herein to refer to a configuration including two data storage systems respectively configured with two devices or volumes with the same identity that cooperate to expose a stretched volume or LUN, such as in the FIGS. 4 and 5, to one or more hosts. In the metro cluster configuration, the hosts and applications running on the hosts perceive the two devices or volumes configured to have the same identity as the single stretched volume, device or LUN.

In a metro cluster configuration, each of the two data storage systems may be in different data centers or may be in two server rooms or different physical locations within the same data center. The metro cluster configuration may be used in a variety of different use cases such as, for example, increased availability and disaster avoidance and DR, resource balancing across data centers and data storage systems, and storage migration.

In a metro cluster configuration, hosts may be configured with uniform host connectivity as illustrated in FIGS. 4 and 5, where a host may be connected to both data storage systems exposing the pair of devices or volumes configured as the same stretched volume or LUN, such as the LUN A described in connection with FIG. 5. From the perspective of the host 2110a of FIG. 5, the data storage system 2102 may be a local data storage system included in the same data center as the host 2110a, and the data storage system 2104 may be a remote data storage system. Thus the host 2110a is configured with uniform host connectivity. In contrast to uniform host connectivity is non-uniform host connectivity, where the host is only connected to the local data storage system but not the remote data storage system of the metro cluster configuration.

Figure 7A:
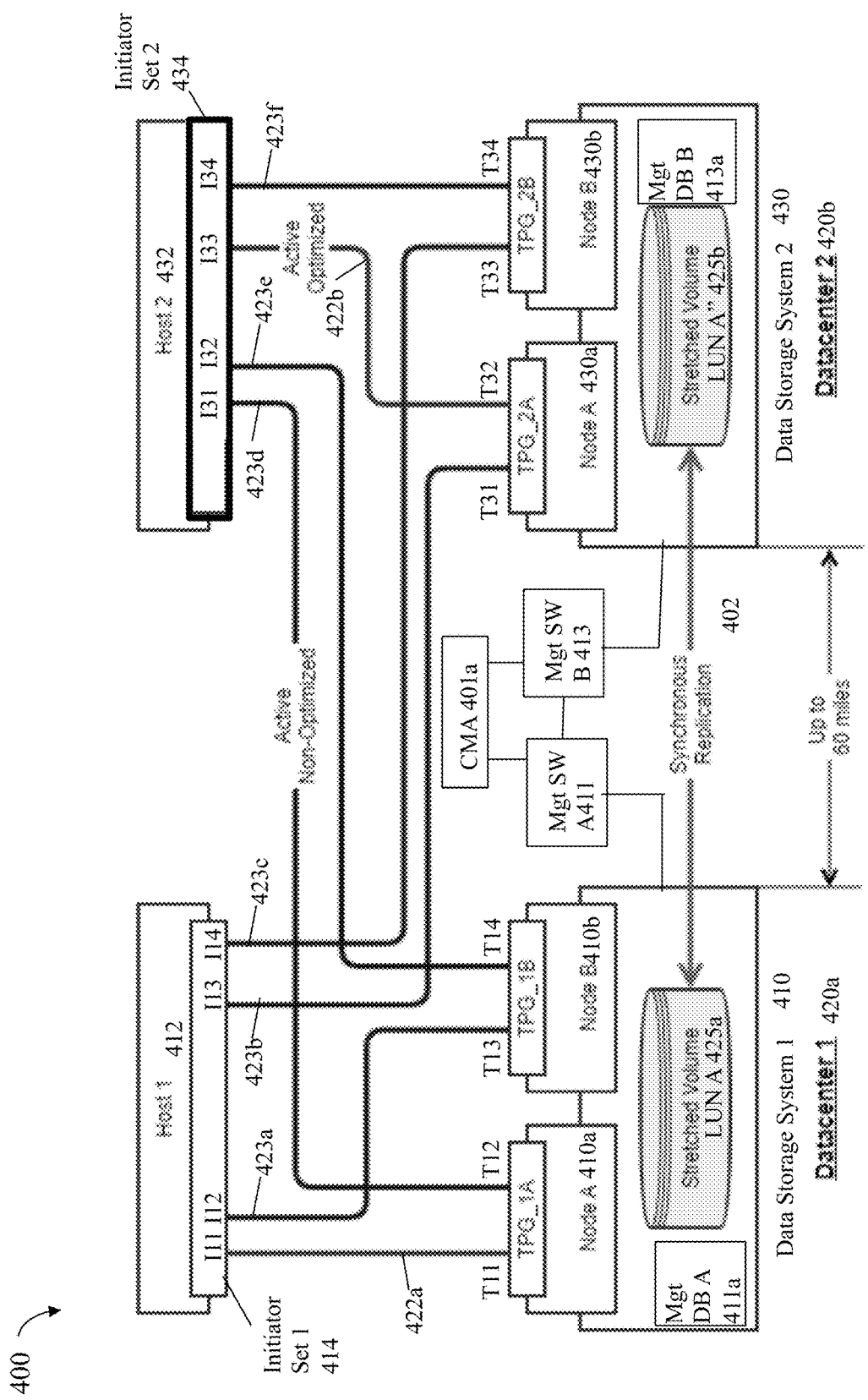
FIGS. 7A and 7B are examples illustrating path states for paths between multiple data storage systems and multiple hosts in a metro cluster configuration with a stretched volume in embodiments in accordance with the techniques herein.

Referring to FIG. 7A, shown is a more detailed illustration of a metro cluster configuration. The example 400 includes a stretched volume or LUN A and two hosts configured 412, 414 with uniform host connectivity in at least one embodiment in accordance with the techniques herein.

In the FIG. 7A, the host 1 412 and the data storage system 1 410 are in the data center 1 420a. The host 2 414 and the data storage system 2 430 are in the data center 2 420b. The host 1 412 includes the initiators I11-I14. The host 432 includes the initiators I31-I34. The data storage systems 410, 430 may be dual node data storage systems such as described elsewhere herein (e.g., FIG. 2). The data storage system 410 includes the node A 410a with the target ports T11-T12, and the node B 410b with the target ports T13-T14. The data storage system 430 includes the node A 430a with the target ports T31-T32, and the node B 430b with the target ports T33-T34. From the perspective of host 1 412, the data storage system 1 410 and data center 1 420a may be characterized as local, and the data storage system 2 430 and the data center 2 420b may be characterized as remote. From the perspective of host 2 432, the data storage system 1 410 and data center 1 420a may be characterized as remote, and the data storage system 2 430 and the data center 2 420b may be characterized as local.

As illustrated in the FIG. 7A, the stretched volume or LUN A is configured from the device or volume pair LUN A 425a and LUN A" 425b, where both the LUNs or volumes 425a-b are configured to have the same identity from the perspective of the hosts 412, 432. The LUN A 425a and the LUN A" 425b are configured for two way synchronous remote replication 402 which, consistent with other description herein, provides for automated synchronous replication of writes of the LUN A 425a to the LUN A" 425b, and also automated synchronous replication of writes of the LUN A" 425b to the LUN A 425a. The LUN A 425a may be exposed to the hosts 412, 432 over the target ports T11-T14 of the system 410, and the LUN A" 425b may be exposed to the hosts 412, 432 over the target ports T31-T34.

In at least one embodiment in which the arrangement of FIG. 7A is in accordance with the ALUA protocol, the paths 423a-f may be configured with the path state of active non-optimized and the paths 422a-b may be configured with the path state of active optimized. Thus, the host 412 has uniform host connectivity to the stretched volume or LUN A by the active connections or paths 422a (I11-T11), 423a (I12-T13) to the data storage system 410 exposing the LUN A 425a, and the active connections or paths 423b (I13-T31), 423c (I14-T33) to the data storage system 430 exposing the LUN A" 425b. The host 432 has uniform host connectivity to the stretched volume or LUN A by the active connections or paths 423d (I31-T12), 423e (I32-T14) to the data storage system 410 exposing the LUN A 425a, and the active connections or paths 422b (I33-T32), 423f (I34-T34) to the data storage system 430 exposing the LUN A" 425b.

Uniform host connectivity deployments such as illustrated in FIG. 7A offer high resiliency to failure of any local component or cross data center connection. Failures such as a total loss of a local storage system (that is local from a host's perspective) result in the host performing I/Os using the cross-datacenter links to the remote data storage system, which results in increased latency but does not require immediate application restart since I/Os issued from the host are still serviced using the remote data storage system. FIG. 7A illustrates a configuration that may also be referred to as a metro cluster configuration with a pair of data storage systems 410, 430. With respect to a host, such as the host 412, one of the data storage systems, such as the system 410, may be local and in the same data center as the host, and the other remaining data storage system, such as the system 430, may be remote and in a different location or data center than the host 412.

With reference to FIG. 7A, the element 411 denotes the data storage system management software application A for the system 410, and the element 413 denotes the data storage system management application B for the system 430. The management applications 411 and 413 may communicate with one another through a network or other suitable communication connection when performing the processing needed for the metro cluster configuration, stretched volumes or LUNs (e.g., such as the LUN A), and the techniques described herein. The element 411a represents the management database (DB) A that stores management and other information used by the management application A 411 for the system 410. The element 413a represents the management DB B that stores management and other information used by the management application B 413 for the system 430. The FIG. 7A also includes the CMA (metro cluster management application) 401a used to provide metro cluster level management. The CMA 401a may communicate with the components 411, 413 for general control path or management path requests. Additionally, the CMA 401a may include a GUI that may be used, for example, to view and display information regarding metrics described elsewhere herein.

Figure 7B:
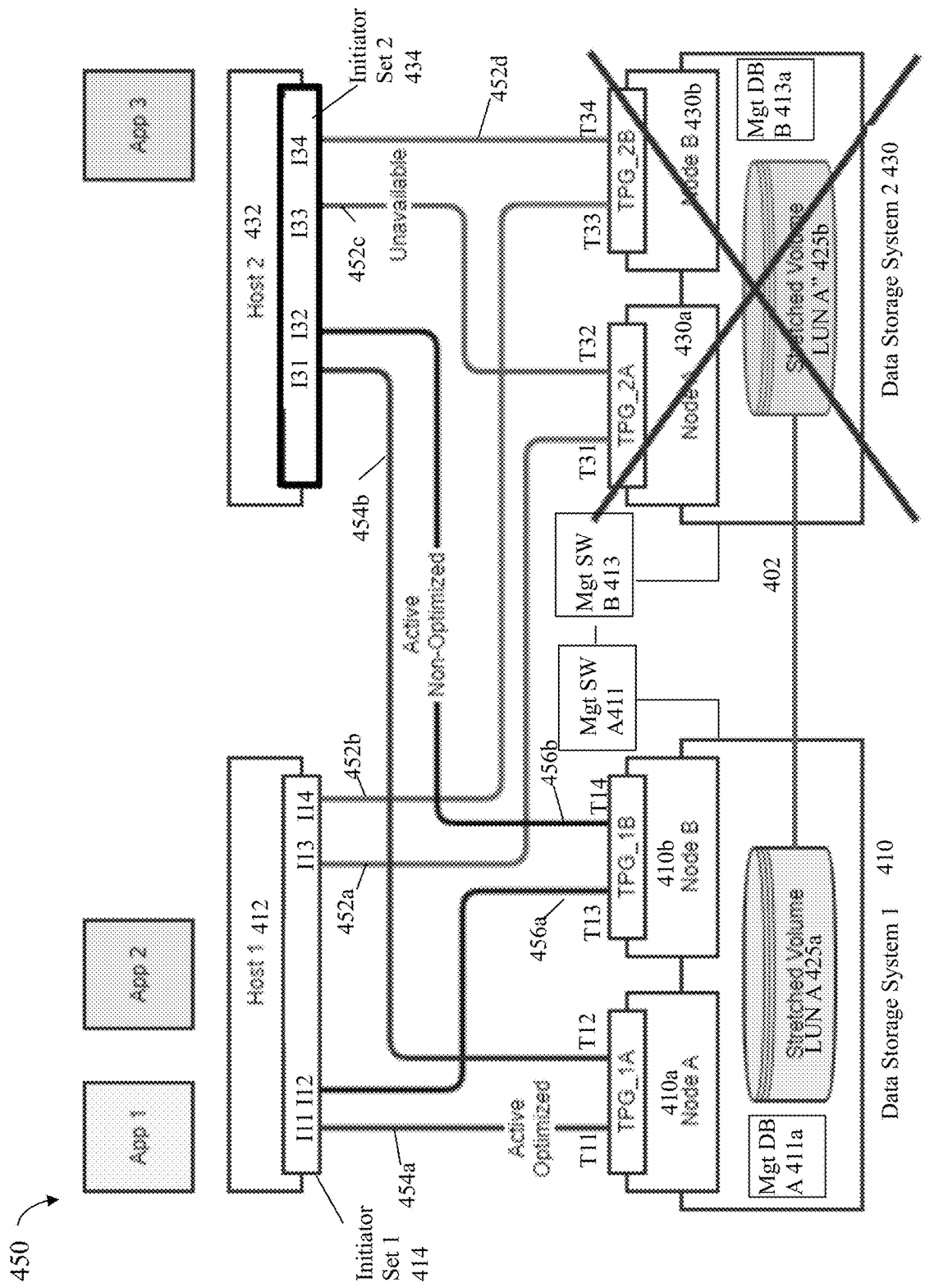

It should be noted that the FIGS. 7A and 7B illustrate each of the data storage systems 410 and 430 as including only a single appliance. However, consistent with other discussion herein, one or both of the data storage systems 410, 430 may comprise multiple appliances or systems configured as a storage cluster or federation. In this manner, multiple appliances or systems may be configured as a storage cluster or federation presented as, or acting as, a single data storage system. In such an embodiment where the data storage system 410 is configured as a storage cluster including multiple dual node appliances, the Mgt SW A 411 may be used to manage such multiple appliances of the storage cluster. In such an embodiment where the data storage system 430 is configured as a storage cluster including multiple dual node appliances, the Mgt SW B 413 may be used to manage such multiple appliances of the storage cluster.

To further illustrate, the FIG. 7A may denote the path states at a first point in time T1. At a second point in time T2 subsequent to T1 and illustrated in the FIG. 7B, the data storage system 2 430 may experience a failure or disaster where the LUN A" 425b on data storage on the system 430 is unavailable and cannot be accessed through the target ports T31-34. In response to the unavailability of the data storage system 430, the host 2 432 uses the path 454b to issue I/Os to the LUN A 425a on the data storage system 410. Thus, failure of the system 430 that is local to the host 432 results in the host 432 performing I/Os using the cross-data center link 454b to the remote system 410 which results in increased latency but does not require immediate application restart since I/Os issued by the application 3 (app 3) on the host 432 may still be serviced using the remote system 410.

In response to the unavailability of the data storage system 430, the paths 452a-d to the system 430 transition to the unavailable path state, the path 454a remains active optimized, the path 454b transitions from active non-optimized to active optimized, and the remaining paths 456a-b remain active non-optimized.

By default, data storage systems may not allow any connected host to access any available LUN or volume. More generally, the data storage system may use an access control mechanism to permit or allow access to data storage system resources. The access control mechanism may be exposed for use by a data storage administrator on the control or management path. In at least one embodiment, one or more interfaces on the control path may be used to specify which volumes or LUNs may be accessed by which particular host(s). For example, the GUI of a data storage management application and/or a command line interface (CLI) may be used to specify which LUNs may be accessed by a particular host.

A user, such as a data storage administrator, may manually perform the necessary configurations of the access control mechanisms on the two data storage systems 410, 430 to provide the hosts 412, 432 with the uniform host connectivity as illustrated in the FIG. 7A and FIG. 7B.

FIG. 7A illustrates connectivity between the hosts 412, 432 and the data storage systems 410, 430 under normal operating conditions where both systems 410, 430 and both volumes or LUNs 425a, 425b are available to the hosts 412, 432 for servicing I/Os. In such normal operating conditions, the ALUA path states may be as described in connection with FIG. 7A where each of the hosts 412, 432 issues I/Os to the particular one of the systems 410, 430 that is local or in the same data center as the particular host. In such normal operating conditions as illustrated in FIG. 7A, at least one "local path" between the host and the local data storage system is active optimized, and remote paths between the host and the remote data storage system are active non-optimized. One or more of the remote paths with respect to a particular host may be used in the event the local data storage system and/or local paths to the local data storage system are unavailable such as described in connection with FIG. 7B with respect to the host 412.

Thus, in the absence of a data storage system failure and under normal operating conditions such as illustrated in FIG. 7A, the host 412 issues I/Os to its local data storage system 410 where the host 412 and the system 410 are located in the same data center 420a; and the host 432 issues I/Os to its local data storage system 430 where the host 432 and the system 430 are located in the same data center 420b.

Generally, an embodiment may use any suitable technique accomplish having each host under normal conditions issue I/Os to a local data storage system in the same data center as the host.

In some implementations, a native host multi-path driver or a third party multi-path drive may be able to differentiate the particular paths to the local data storage system and the particular paths to the remote data storage system based on path latency. Generally the paths experiencing the largest latencies when sending an I/O may be determined as those to the remote data system, and those with the smallest latencies may be determined as those to the local data storage system. In such implementations, the host utilizes its multi-path driver to select a particular path to a local data storage system over which to send I/Os.

In at least one embodiment in accordance with the techniques herein, processing may be performed consistent with discussion elsewhere herein where the data storage systems determine the ALUA path states, such as in connection with FIGS. 6, 7A and 7B, and expose or communicate such ALUA path states (also sometimes referred to herein access states) to the hosts. Thus, when the LUN is exposed to a host initiator over multiple paths (e.g., where the same LUN is accessible through multiple different target ports of the data storage system), the data storage systems may vary the associated access state of each such path in order to vary and control the particular ones of the multiple paths over which the host may issue I/Os to the LUN. In particular, processing may be performed by the data storage systems, such as the systems 410, 430 of FIGS. 7A and 7B, to determine which particular paths to the hosts 412, 432 are active optimized and which are active non-optimized at various points in time. The processing may include the data storage systems 410, 430 communicating the path states to the hosts 412, 432 and then also notifying the hosts 412, 432 when there are any changes to the path states, such as in response to a data storage system failure such as illustrated in FIG. 7B. In this manner, the hosts 412, 432 may select paths over which to send I/Os based on the particular ALUA path states or access states for particular volumes or LUNs as determined and communicated by the data storage systems 410, 430, where I/Os are sent by the hosts over those active-optimized paths.

Consistent with other discussion herein, depending on the data storage system implementation, only a single ALUA path within a local data center with respect to a host for a stretched volume may be active optimized such as illustrated in FIG. 7A. In contrast to the foregoing, alternatively, more than a single ALUA path within a local data center for a particular host may be active optimized for the stretched volume. However, in such embodiments consistent with other discussion herein, paths from a host to a remote data storage system and a remote data center for a remote copy of the stretched volume may be active non-optimized in order to make the host prefer to use local paths to the local copy of the stretched volume. It should be noted that while particular figures such as FIG. 7A may show just a single active optimized path for simplicity, in most real-life deployments, paths may between the host and a data storage system may have an associated access path state at the group level, such as based on a group of target ports as discussed elsewhere herein.

Consistent with discussion herein such as in connection with FIGS. 5, 7A and 7B, a stretched volume or LUN is configured from a LUN or volume pair (R1, R2), where R1 and R2 are different instances of LUNs or volumes respectively on two data storage systems of the metro cluster. Further, the volumes R1 and R2 are configured to have the same identity and appear to a host as the same volume or LUN. Thus, a volume or LUN on a first local data storage system may be characterized as stretched if that volume or LUN also has a matching counterpart remote volume or LUN on the other remote data storage system of the metro cluster pair.

In contrast to the stretched volume or LUN is an unstretched or non-stretched volume or LUN. A volume or LUN may be characterized as an unstretched volume or LUN existing on only one data storage system within the metro cluster pair.

An operation referred to herein as stretching a LUN or volume may be applied to an unstretched LUN or volume whereby a local unstretched volume or LUN on only one of the data storage systems of the metro cluster pair is converted to a stretched LUN or volume. Converting the unstretched volume or LUN of a first local data storage system of the metro cluster pair to a stretched volume may include creating a counterpart remote LUN on the second remote data storage system of the metro configuration. Consistent with other discussion herein regarding a stretched volume or LUN, from the external host perspective, the counterpart remote LUN is configured to have the same identity as the non-stretched LUN on the first data storage system. In connection with stretching an existing local unstretched LUN, the local LUN has its attribute modified to stretched to denote a stretched volume. Additionally, the remote counterpart LUN that is created has the stretched attribute.

In connection with stretching a LUN, such as stretching the LUN A 425*a* resulting in the stretched LUN or volume configuration with the volumes 425*a* and 425*b* as illustrated in the FIG. 7A, ALUA path state changes may be made so that the host 1 412 local to the storage system 410 has one or more active optimized paths to the local stretched LUN copy 425*a* on the system 410 and one or more active non-optimized paths to the remote stretched LUN copy 425*b* on the system 430. Additionally, ALUA path state changes may be made so that the host 2 432 local to the storage system 430 has one or more active optimized paths to the local stretched LUN copy 425*b* on the system 430 and one or more active non-optimized paths to the remote stretched LUN copy 425*a* on the system 410. In some contexts as discussed herein, a LUN or volume and data storage system may be characterized as local with respect to a host if the host, LUN and data storage system are located in the same data center.

An operation referred to herein as unstretching a LUN or volume may be applied to a stretched LUN or volume whereby the stretched LUN or volume is converted to a local unstretched volume or LUN on only one of the data storage systems of the metro cluster. The existing stretched volume is configured from a volume pair (R1, R2), where R1 and R2 are different instances of LUNs or volumes respectively on two data storage systems of the metro cluster and R1 and R2 are configured to have the same identity and appear to a host as the same volume or LUN. Converting the stretched volume or LUN to an unstretched volume R1 on only a first data storage system of the metro cluster pair may include deleting or removing its counterpart remote volume R2 on the second remote data storage system of the metro configuration.

The concepts or attributes of stretched and unstretched are described herein in connection with volumes or LUNs, or more generally, storage resources or objects (sometimes referred to simply as resources or objects).

The metro cluster configuration such as described above and illustrated, for example, in connection with FIGS. 7A and 7B, may be characterized as complex to configure and manage. As described above, a volume or LUN, such as the LUN A of FIGS. 7A and 7B, may be configured as a stretched LUN A from a pair of volumes or LUNs configured for bidirectional synchronous replication on two data storage systems or appliances 410, 420. In such a configuration, it may be desirable to provide a storage manager or administrator with multiple metrics regarding the metro cluster configuration to facilitate an understanding of the current state of the system. In at least one embodiment, such metrics may be used to monitor the state of the metro cluster and it's components at various levels to assist in troubleshooting, such as identifying problems in the systems and assisting in correcting detected problems.

Described in the following paragraphs are metrics that may be provided and used in an embodiment in accordance with the techniques herein. In at least one embodiment, multiple metrics may be provided at different levels including a metro cluster level, a storage cluster or federation level (e.g., if applicable where a group of appliances are configured as a single data storage system, storage cluster or federation), an appliance level (e.g., per appliance), a node level, and a resource level. In at least one embodiment, the foregoing levels may be ranked, from a highest level to a lowest level, as follows: the metro cluster level, the storage cluster or federation level, the appliance level, the node level, and the resource level. It should be noted that the metrics provided per data storage system may generally include information about a single appliance, or a group of appliances or systems configured as a storage cluster or federation. The metro cluster level as the highest level provides the broadest view of information of the metro cluster configuration. A user may, for example, drill down through multiple levels from a first level to a second level, where the first level is ranked higher than the second level. In this manner, a user may, for example, initially view the configuration at the highest metro cluster level using one or more metrics. The user may then select to drill down sequentially to one or more lower level metrics at the storage cluster level (if applicable), then the appliance level, then the node level, and then the resource level. The foregoing may be used, for example, in connection with problem detection and troubleshooting to further identify a root cause of a problem using metrics of one or more lower levels where the problem may be originally identified using a higher level metric.

Metrics at the metro cluster level may provide information regarding operation, performance and/or status of the entire metro cluster configuration including two appliances or data storage systems such as illustrated in FIGS. 7A and 7B. Metrics at the storage cluster level or federation may provide information regarding operation, performance and/or status of multiple appliances or systems configured as a storage cluster or federation. Metrics at the appliance level or per system level may provide information regarding the operation, performance and/or status of each appliance or system. In at least one embodiment in which a group of multiple appliances or systems are configured as a storage cluster, federation or as a single data storage system, the storage cluster level may provide an aggregate collective view regarding all the multiple appliances or systems of the group configured as the storage cluster, federation or single data storage system. In at least one embodiment in which the group of multiple appliances or systems are configured as a storage cluster, federation or single data storage system, the appliance level may provide a view of per appliance or system of the group configured as the storage cluster or federation. Metrics at the node level may provide information regarding the operation, performance and/or status of each individual node within a single appliance or data storage system. Metrics at the resource level may provide information regarding the operation, performance and/or status of an individual resource such as an individual storage resource or object such as, for example, a volume or LUN, a volume group denoting a defined logical group of one or more LUNs, or a file system.

Described in the following paragraphs are some example uses of the metrics that may be used to understand and monitor the operation and state of the metro cluster configuration and components and resources thereof.

In at least one embodiment, some of the metrics may be characterized as local with respect to a local storage resource or object (sometimes referred to as a local resource or object) configured as unstretched in a single system or appliance. In at least one embodiment, some of the metrics may be characterized as particular to the metro cluster environment and may apply to a metro storage resource or object (sometimes referred to as a metro resource or object) configured in connection with a stretched resource or object, such as a stretched LUN, in the metro cluster configuration. For example, a volume or LUN B that is configured as unstretched in a single system or appliance is a local resource. In at least one embodiment, a metro cluster configuration may include both local unstretched resources or objects as well as stretched metro resources or objects. For example, a local resource such as the above-noted LUN B is not included in a device pair of a configured stretched LUN. Rather the local resource LUN B configured on a local system does not have a remote counterpart LUN configured with the same identity on the remote system. In contrast to the local resources are metro resources configured in connection with stretched resources or objects of the metro cluster configuration. For example with reference to FIG. 7A, a the LUN A 425a and the LUN A" 425b are two metro resources or objects included in a device pair of the configured stretched LUN A. A first metro resource, such as the volume or LUN 425a, is configured on the local system 410 and has a remote counterpart, LUN 425b, that is a second metro resource configured with the same identity as 425a on the remote system 430.

In at least one embodiment, a user may be able to view any of the provided metrics at any desired level, such as in a graph of a GUI.

The foregoing and other aspects of the metrics and use thereof in connection with the techniques described herein are in the following paragraphs.

It should be noted that the following paragraphs describes multiple metrics at multiple levels that may be provided for use in connection with the metro cluster configuration such as with reference to FIGS. 7A and 7B. However, an embodiment in accordance with the techniques herein may generally provide and use any one or more the foregoing metrics at one or more of the different levels described herein.

In at least one embodiment, a resource or storage object, such as a volume, volume group or file system, on a system of the metro cluster may be configured as a metro resource or a local resource. The metro resource may be further characterized as stretched, and the local resource may be further characterized as unstretched. In at least one embodiment, a metro resource may be a storage resource or object configured as a one of a pair of resources or objects in a metro cluster configuration, respectively, on the two systems 410, 430, where the two resources or storage objects of the pair are configured to have the same identity to the host or external client, and where the two resource or storage objects of the pair are configured for synchronous bi-directional data replication. Alternatively, the resource may be configured as a local resource or storage object where the resource is unstretched and configured on only a single system or appliance in the metro cluster. For example and consistent with other discussion herein, a local resource is a LUN that is not configured as a stretched LUN and is rather configured using a single volume or LUN on only one of the systems 410 or 430. In contrast, the stretched LUN described elsewhere herein is configured from two metro resources or storage objects respectively on the two systems 410, 430, where the two metro resources or storage objects are configured to have the same identity to the host or external client, and where the two metro resources or storage objects are configured for synchronous bi-directional data replication.

In at least one embodiment, the following metrics 1a) through 1i) described below may be provided at the individual metro resource level, such as per volume or LUN, per volume group, or per file system, where the metro resources are configured as stretched resources, such as the stretched LUN A of FIG. 7A, having counterparts on both the systems 410 and 430:

1a) Average "mirroring overhead" latency. This latency denotes the average amount of time in connection with replicating a write I/O from a receiving appliance or data storage system to its peer appliance or data storage system. Thus, the average mirroring overhead latency metric is applicable for use with stretched metro resources, such as the stretched LUN A, configured in the metro cluster configuration to have a corresponding device pair of identically configured volumes or LUNs 425a-b. For example with reference to FIG. 7A, assume that write I/Os directed to the metro resource LUN A 425a (e.g., stretched LUN A) are received at the appliance or system 410. The average mirroring overhead latency for the metro resource 425a refers to the average amount of time it takes to replicate the write I/Os directed to the volume 425a from the system 410 to the remote system 430.

The average mirroring overhead latency metric is helpful in detecting problems in network connectivity between storage systems or appliances. For example, as will be described in more detail below, if the average mirroring overhead latency is zero for a metro resource such as the LUN or volume 425a used in configuring the stretched LUN A of FIG. 7A, then there may be a problem with the network connection(s) or link(s) used for synchronous replication of the data between the systems 410 and 430, or the system 430 receiving the replicated writes over the network connection(s) used for synchronous replication may be down or offline. As another example, if the mirroring overhead latency for the metro resource LUN A 425a is relatively stable or approximately the same (e.g., within specified tolerances) across time, then the network connection and connectivity used for the synchronous replication of the write I/O data may be characterized as healthy. As a variation, if the mirroring overhead latency for the metro resource LUN A 425a is not relatively stable or is not approximately the same (e.g., exceeds specified tolerance or allowable variation) across time, then there may be network problems with the network connection(s) and connectivity used for the synchronous replication of the write I/O data. In this latter case, the system administrator or manager may perform other tasks to further isolate and correct the network problem.

In at least one embodiment, the mirroring overhead latency for each write I/O received at a local system for a metro resource, such as the LUN A 425 configured as a volume for the stretched LUN A, may be measured as the amount of time from 1) a starting time of when the write I/O is transmitted from the local system 410 to the remote system 430 to 2) an ending time of when the local system 410 receives an acknowledgement from the remote system 430 that the write I/O has been received at the remote system 430. In this manner, the average mirroring overhead latency for a metro resource, such as the LUN A 425 configured for use with a stretched LUN, may denote the average amount of the foregoing mirroring overhead latency determined with respect to write I/Os directed to the LUN A 425, where the write I/Os may be received at the system 410. To further illustrate, if there are 10 write I/Os directed to the LUN A 425 received at the system 410 that are replicated to the system 430, the average mirroring overhead latency for the metro resource LUN A 425 represents the average mirroring overhead latency determined when replicating the foregoing 10 write I/Os from the system 410 to the system 430.

1b) Average write I/O latency. The average write I/O latency includes both the latency for the local write and also the latency for replicating the write I/O to the remote peer system. In at least one embodiment, the average write I/O latency for the metro resource LUN A 425 configured in connection with the stretched LUN A may denote the average amount of time it takes to complete a write I/O operation directed to the LUN A 425, where for each write I/O, the start time for the write I/O's latency is when the write I/O is received by the local system 410 from the host or other external client, and where the end time for the write I/O's latency is when the local system 410 returns an acknowledgement to the host that the host write I/O has completed. In this manner, the write I/O latency includes a first amount of time spent on the local system 410 that received the write I/O operation to store the write I/O in its cache, and also includes the second amount of time to replicate the write I/O from the local system 410 to the remote peer system 430. The average write I/O latency for a metro resource may be further characterized as the average write I/O latency from the perspective of the front end of the local system receiving the writes.

1c) Average I/O latency. The average I/O latency includes latency for both local read I/Os serviced by the local receiving system and also for write I/Os that are replicated to the remote peer storage system. In at least one embodiment, read I/Os directed to a metro resource, such as the LUN 425*a* configured as a volume for the stretched LUN A, may be serviced using the local data copy (LUN 425*a*) of the stretched LUN. The read I/O latency for a read I/O operation may be measured as the amount of time from when the read I/O is received at a data storage system or appliance, to when the system or appliance returns the read I/O data to the requesting host.

To further illustrate with reference to FIG. 7A, assume 5 read I/Os and 5 write I/Os are directed to the metro resource LUN 425A configured as a volume for the stretched LUN A. The 5 read I/Os and 5 write I/Os are received at the system 410. The average I/O latency denotes the average latency or amount of time it takes to 1) service the 5 read I/Os using the local copy 425*a* of LUN A on the system 410 and 2) service the 5 write I/Os. For each of the 5 write I/Os, the write I/O latency is consistent with that as discussed above in 1b) and is measured per write I/O as the time between the start time for latency (e.g., when the write I/O is received by the local system from the host or other external client) and the end time for latency of the write I/O (e.g., when the local system returns an acknowledgement to the host that the host write I/O has completed). In this manner, the write I/O latency for each write includes a first amount of time spent on the local system that received the write I/O operation to store the write I/O in its cache, and also includes the second amount of time to replicate the write I/O to the remote peer system.

In at least one embodiment, the average I/O latency may be expected to be stable or approximately the same (within a specified tolerance or variation) over time. Otherwise, there may be a problem at points in time when the average I/O latency increases and exceeds the allowable tolerance or variation). For example, there may be a problem with the network such as due to network congestion due to one or more failed links or connections between the host and data storage systems or appliances.

1d) "Mirrored" write I/O bandwidth. The mirrored write I/O bandwidth is the bandwidth or amount of data transmitted when replicating write I/Os directed to a metro resource from the local system to the remote peer system in connection with the synchronous replication of the write I/O data. For example, consider the metro resource LUN 425*a* configured for use with the stretched LUN A of FIG. 7A. In this case, the mirrored write I/O bandwidth for the metro resource 425*a* may be measured as the amount of write data directed to the LUN 425*a* of the system 410 that is replicated 402 to the remote system 430 as part of the synchronous replication performed with the configured stretched LUN A. The mirrored write I/O bandwidth may be used in connection with detecting problems in network bandwidth between systems of the metro cluster configuration, such as bandwidth problems with the network connection(s) used for the synchronous replication of data between the systems 410 and 430.

The mirrored write I/O bandwidth metric may be used, for example, to determine whether the currently provisioned bandwidth capability for replication between the systems 410 and 430 of the metro cluster is sufficient, or if it is necessary to increase the bandwidth capability of the link(s) used for synchronous remote replication of write I/Os of the stretched LUN or other stretched resource.

In at least one embodiment, the mirrored write I/O bandwidth may be expressed or measured, for example, as an average value or rate with respect a specified unit of time (e.g., number of storage units per second such as number of bytes/second). As a variation, in at least one embodiment, the mirrored write I/O bandwidth may be expressed or measured, for example, as a percentage with respect to the total bandwidth capability provisioned for the synchronous remote replication of write I/Os of the stretched LUN or other stretched metro resource. With this latter case, if the mirrored write I/O bandwidth is approximately 100% (within a specified limit or tolerance), then it may be determined that the current provisioned bandwidth is saturated and should be increased in any suitable manner.

1e) Total I/O bandwidth. The total I/O bandwidth includes the bandwidth for the read I/O data transmitted and also for the write I/O data transmitted. The total I/O bandwidth for a resource includes the total amount of data transmitted in connection with all reads and all writes directed to the resource. Put another way, the total I/O bandwidth denotes the front end perspective of the total amount of data transmitted to and from the resource in connection with read and writes directed to the resource. For example, if the metro cluster (e.g., collectively systems 410 and 430 collectively) returns X bytes/second of requested read data from the metro resource LUN A 425 configured as a volume of the stretched LUN A and writes Y bytes/second of data to the metro resource LUN A 425, then the total I/O bandwidth is (X+Y) bytes/second for the metro resource LUN A 425*a* configured as a volume of the stretched LUN A. In at least one embodiment, the total I/O bandwidth may be expressed or measured, for example, as an average value or throughput in terms of an amount of read and write data transferred with respect a specified unit of time.

1f) "Mirrored" write I/Os per second. The mirrored write I/Os per second or mirrored write IOPS may be characterized as a write I/O rate in seconds (write IOPS) for write I/Os replicated from a local system to a remote peer system for write I/Os directed to a particular resource. Put another way, the mirrored write IOPS for a metro resource, such as the volume 425a of the stretched LUN A, denotes the write IOPS or write I/O rate for write I/Os directed to the volume 425a that are subsequently transmitted or replicated from the system 410 to the remote system 430 over the link(s) used for synchronous replication 402 of FIG. 7A.

1g) Total I/Os per second. The total I/Os per second or total IOPS denotes the collective read I/O rate per second and write I/O rate per second for I/Os directed to a particular metro resource. Put another way, the total I/Os per second or total IOPS for a resource such as the volume 425a of the stretched LUN A of FIG. 7A denote the total IOPS directed to the volume 425a LUN A with respect to read and writes, collectively, received by the system 410.

1h) Write I/O bandwidth. The write I/O bandwidth denotes the write I/O bandwidth directed to the resource. In at least one embodiment, the write I/O bandwidth metric may be provided for each local resource and also each metro resource. If the resource is configured as a metro resource, such as the volume 425a for the stretched LUN A, the write I/O bandwidth is expected to be the same as the mirrored write I/O bandwidth as described above in connection with 1d) (e.g., each write received at a local system is replicated to the remote peer system). If the resource is configured as a local resource, such as a local single unstretched LUN on only one of the systems 410 or 430 of the metro cluster, the write I/O bandwidth generally denotes the write I/O bandwidth directed to the local LUN.

1i) Write I/Os per second (IOPS). The write IOPS denotes the write IOPS or more generally write I/O rate of write I/Os directed to the resource. In at least one embodiment, the write IOPS metric may be provided for each local resource and also each metro resource. If the resource is configured as a metro resource, such as the volume 425a for the stretched LUN A, the write IOPS is expected to be the same as the mirrored write IOPS as described above in connection with 1f). If the resource is configured as a local resource, such as a local single unstretched LUN on only one of the systems 410 or 430 of the metro cluster, the write IOPS generally denotes the write IOPS directed to the local LUN.

In at least one embodiment, the following metrics 2a) through 2j) described below may be provided at the storage appliance node level, the appliance level, the storage cluster or federation level, and the metro cluster level:

2a) Average "mirroring overhead" latency across all metro resources. The average mirroring overhead latency for a single metro resource is described in 1a) above. The average mirroring overhead latency metric at the node, appliance, storage cluster, and metro cluster levels may also be used in detecting problems in network connectivity between systems. At the node level, the average mirroring overhead latency denotes the average amount of time in connection with replicating write I/Os from a receiving appliance or data storage system to its peer appliance or data storage system. The average mirroring overhead latency at the node level is with respect to all write I/Os for all metro resources received at a single node such as, for example, with respect to all write I/Os received at the node A 410a of FIG. 7 for all metro resource volumes of all stretched LUNs. The average mirroring overhead latency at the appliance level is with respect to all write I/Os for all metro resources received at a single data storage system or appliance such as, for example, with respect to all write I/Os that are directed to all metro resource volumes or stretched LUNs and are received by the system 410 of FIG. 7A (e.g., collectively all write I/Os received at the nodes 410a-b for all volumes configured for stretched LUNs). The average mirroring overhead latency at the metro cluster level is with respect to all write I/Os for all metro resources received by the cluster, such as by both systems or appliances 410, 430. The average mirroring overhead latency at the storage cluster level or federation is with respect to all write I/Os for all metro resources received by a group of multiple appliances or systems configured as a federation.

2b) Average write I/O latency collectively across all local resources. The average write I/O latency for a single metro resource is described in 1b) above. At the node level, the average write I/O latency denotes the average write I/O latency with respect to all write I/Os for all local resources received at a single node such as, for example, with respect to all write I/Os received at the node A 410a of FIG. 7 for all local resources. The average write I/O latency at the appliance level is with respect to all write I/Os for all local resources received at a single data storage system or appliance such as, for example, with respect to all write I/Os that are directed to all local resources. The average write I/O latency at the metro cluster level is with respect to all write I/Os that are directed to local resources of the metro cluster (e.g., write I/Os directed to local resources where the write I/Os are received collectively by both systems or appliances 410, 430). The average write I/O latency at the federation or storage cluster level is with respect to all write I/Os that are directed to local resources of the storage cluster or federation comprising a group of appliances or systems.

2c) Average I/O latency collectively across local resources and metro resources. The average I/O latency for a single metro resource is described in 1c) above. At the node level, the average I/O latency denotes the average I/O latency with respect to all I/Os received at a single node for all metro resources as well as local resources. For example, the average I/O latency at the node level may be determined with respect to all write I/Os received at the node A 410a of FIG. 7 for all metro resource volumes of stretched LUNs as well as other local LUNs that are not stretched and rather are configured on only the system 410. For example, the LUN B may be a LUN that is a local resource configured on only the system 410. At the appliance level, the average I/O latency denotes the average I/O latency with respect to all I/Os received at a single appliance or system for all metro resources as well as local resources. The average I/O latency at the metro cluster level is with respect to all I/Os for all metro resources and local resources received by the metro cluster, such as by both systems or appliances 410, 430. The average I/O latency at the federation or storage cluster level is with respect to all I/Os for all metro resources and local resources received by the group of multiple appliances configured as a federation or storage cluster.

2d) "Mirrored" write I/O bandwidth across all metro resources. The mirrored write I/O bandwidth for a single metro resource is described above in connection with 1d). The mirrored write I/O bandwidth metric at the node, appliance, storage cluster or federation, and metro cluster levels may be used, for example, to determine whether the currently provisioned bandwidth capability for replication between the systems 410, 430 of the metro cluster is sufficient, or if it is necessary to increase the bandwidth capability of the link(s) used for synchronous remote replication of write I/Os of the stretched LUN or other stretched resource. At the node level, the mirrored write I/O bandwidth is the write bandwidth with respect to all write I/Os received at a single node for all metro resources. At the appliance level, the mirrored write I/O bandwidth is the write bandwidth with respect to all write I/Os received at a single appliance for all metro resources. At the metro cluster level, the mirrored write I/O bandwidth is the write bandwidth with respect to all write I/Os received by the metro cluster (e.g., both systems 410, 430 collectively) for all metro resources. At the federation or storage cluster level, the mirrored write I/O bandwidth is the write bandwidth with respect to all write I/Os received by the group of appliances configured as the federation or storage cluster collectively for all metro resources.

2e) Total I/O bandwidth collectively across local resources and metro resources. The total I/O bandwidth with respect to a single metro resource is described above in connection with 1e). At the node level, the total I/O bandwidth is the bandwidth with respect to all read and write I/Os received at a single node, collectively, for all metro resources and all local resources. For example, at the node level for the node 410a, the total I/O bandwidth of the node 410a denotes the bandwidth with respect to all reads and writes directed to all metro and local resources received by the node 410a. At the appliance level, the total I/O bandwidth is the bandwidth with respect to all read and write I/Os received at a single system or appliance, collectively, for all metro resources and all local resources. For example, at the appliance level for the system 410, the total I/O bandwidth of the system 410 denotes the bandwidth with respect to all reads and writes directed to all metro and local resources received by the system 410. At the metro cluster level, the total I/O bandwidth is the bandwidth with respect to all read and write I/Os received by the metro cluster (e.g., both systems 410, 430 collectively) for all metro resources and local resources. At the federation or storage cluster level, the total I/O bandwidth is the bandwidth with respect to all read and write I/Os received by the group of appliances configured as the storage cluster or federation collectively for all metro resources and local resources.

2f) "Mirrored" write I/Os per second (IOPS) across all metro resources. The mirrored write IOPS with respect to a single metro resource is described above in connection with 1f). At the node level, the mirrored write IOPS denotes the IOPS with respect to all write I/Os received at a single node, collectively, for all metro resources. For example, at the node level for the node 410a, the mirrored write IOPS of the node 410a denotes the IOPS with respect to all writes directed to all metro resources received by the node 410a. At the appliance level, the mirrored write IOPS denotes the IOPS with respect to all write I/Os received at a single system or appliance, collectively, for all metro resources. For example, at the appliance level for the system 410, the mirrored write IOPS of the system 410 denotes the IOPS with respect to all writes directed to all metro resources received by the system 410. At the metro cluster level, the mirrored write IOPS denotes the IOPS with respect to all write I/Os received by the metro cluster (e.g., both systems 410, 430 collectively) for all metro resources. At the federation or storage cluster level, the mirrored write IOPS denotes the IOPS with respect to all write I/Os received by the group of appliances or systems configured as the storage cluster or federation collectively for all metro resources.

2g) Total I/Os per second (IOPS) collectively across local resources and metro resources. The total IOPS with respect to a single metro resource is described above in connection with 1g). At the node level, the total IOPS is with respect to all read and write I/Os received at a single node, collectively, for all metro resources and all local resources. For example, at the node level for the node 410a, the total IOPS of the node 410a denotes the number of IOPS with respect to all reads and writes directed to all metro and local resources received by the node 410a. At the appliance level, the total IOPS denotes the number of IOPS with respect to all read and write I/Os received at a single system or appliance, collectively, for all metro resources and all local resources. For example, at the appliance level for the system 410, the total IOPS of the system 410 denotes the IOPS with respect to all reads and writes directed to all metro and local resources received by the system 410. At the metro cluster level, the total IOPS is the IOPS with respect to all read and write I/Os received by the metro cluster (e.g., both systems 410, 430 collectively) for all metro resources and local resources. At the federation or storage cluster level, the total IOPS is the IOPS with respect to all read and write I/Os received by the group of appliances configured as the federation or storage cluster collectively for all metro resources and local resources.

2h) Average mirrored write I/O latency collectively across all metro resources. The average write I/O latency for a single metro resource is described in 1b) above. The average mirrored write I/O latency denotes the write I/O latency with respect to write I/Os for only metro resources, as compared to the average write I/O latency 2b) which is with respect to write I/Os for only local resources. Consistent with discussion elsewhere herein such as in connection with the metric 1b), the mirrored write I/O latency for a metro resource, such as the volume 425a of the system 410 of FIG. 7A, includes both the latency for the persisting the write I/O data locally on the system 410, and also the latency for replicating the write I/O to the remote peer system. The mirrored write I/O latency for a write I/O directed to a metro resource may be determined as the total amount of time that elapses between a first time L1, when the write I/O is received by the local system 410 from the host or other external client, and a second time L2, when the local system 410 returns an acknowledgement to the host that the host write I/O has completed. In this manner, the mirrored write I/O latency includes a first amount of time spent on the local system 410 that received the write I/O operation to store the write I/O in its cache, and also includes a second amount of time to replicate the write I/O from the local system 410 to the remote peer system 430.

At the node level, the average mirrored write I/O latency 2h) denotes the average write I/O latency with respect to all write I/Os for all metro resources received at a single node such as, for example, with respect to all write I/Os received at the node A 410a of FIG. 7 for all metro resource volumes configured for stretched LUNs. The average mirrored write I/O latency at the appliance level is with respect to all write I/Os for all metro resources received at a single data storage system or appliance such as, for example, with respect to all write I/Os that are directed to all metro resource volumes of the system 410 configured for use with stretched LUNs (e.g., collectively all write I/Os received at the nodes 410a-b for all volumes of the system 410 configured for use with stretched LUNs). The average write I/O latency at the metro cluster level is with respect to all write I/Os that are directed to metro resources of the metro cluster (e.g., write I/Os directed to metro resources where the write I/Os are received collectively by both systems or appliances 410, 430). The average write I/O latency at the federation or storage cluster level is with respect to all write I/Os that are directed to metro resources of the group of appliances configured as the federation or storage cluster collectively.

2i) Write I/O bandwidth collectively across all local resources. At the node level, the write I/O bandwidth denotes the bandwidth with respect to all write I/Os for all local resources received at a single node such as, for example, with respect to all write I/Os received at the node A 410*a* of FIG. 7 for all local resources. The write I/O bandwidth at the appliance level is with respect to all write I/Os for all local resources received at a single data storage system or appliance such as, for example, with respect to all write I/Os that are directed to all local resources. The write I/O bandwidth at the metro cluster level is with respect to all write I/Os that are directed to local resources of the metro cluster (e.g., write I/Os directed to local resources where the write I/Os are received collectively by both systems or appliances 410, 430). The write I/O bandwidth at the federation or storage cluster level is with respect to all write I/Os that are directed to local resources of a group of multiple appliances configured as the federation or storage cluster (e.g., write I/Os directed to local resources where the write I/Os are received collectively by the group of appliances configured as the federation or storage cluster).

2j) Write I/Os per second (IOPS) collectively across all local resources. At the node level, the write IOPS denotes the IOPS with respect to all write I/Os for all local resources received at a single node such as, for example, with respect to all write I/Os received at the node A 410*a* of FIG. 7 for all local resources. The write IOPS at the appliance level is with respect to all write I/Os for all local resources received at a single data storage system or appliance such as, for example, with respect to all write I/Os that are directed to all local resources. The write IOPS at the metro cluster level is with respect to all write I/Os that are directed to local resources of the metro cluster (e.g., write I/Os directed to local resources where the write I/Os are received collectively by both systems or appliances 410, 430). The write IOPS at the federation or storage cluster level is with respect to all write I/Os that are directed to local resources of the group of appliances configured as the federation or storage cluster (e.g., write I/Os directed to local resources where the write I/Os are received collectively by the group of appliances configured as the storage cluster or federation).

In at least one embodiment, the metrics described herein used in connection with IOPS (e.g., metrics such as described in connection with 1g), 2g), 1f) and 2f) above) may be scaled or normalized to use the same I/O size or data payload size. As a variation, in at least one embodiment, the metrics used in connection with IOPS may use raw or unnormalized values whereby the I/Os may have varying data payload sizes.

In at least one embodiment, some of the metrics described herein may denote averages (e.g., metrics such as described in connection with 1a), 1b), 1c), 2a), 2b) and 2c) above) computed in any suitable manner with respect to any suitable time period over which the average metric values are determined. For example, in at least one embodiment, an average metric value for the average I/O latency of 1c) and 2c) may be determined based on a week of daily averages.

The FIGS. 8 and 9 below provide examples using metrics at the individual resource level. In at least one embodiment, at the individual resource level, the average write I/O latency metric may be provided for both local resources and metro resources. In at least one embodiment, at the individual local resource level, the average write I/O latency (e.g., 1b)) may denote the write I/O latency for writes to the local resource. At the individual metro resource level, the average write I/O latency (e.g., 1b)) may denote the write I/O latency for writes to the metro resource where such writes are also replicated to the remote system. In at least one embodiment, at the individual local resource level, the write I/O bandwidth (e.g., 1h)) may denote the bandwidth for writes to the local resource. At the individual metro resource level, the write I/O bandwidth (e.g., 1h)) may denote the bandwidth for writes to the metro resource where such writes are also replicated to the remote system. In at least one embodiment, at the individual local resource level, the write IOPS (e.g., 1i)) may denote the write IOPS to the local resource. At the individual metro resource level, the write IOPS (e.g., 1i)) may denote the write IOPS to the metro resource where such writes are also replicated to the remote system.

Figure 8:
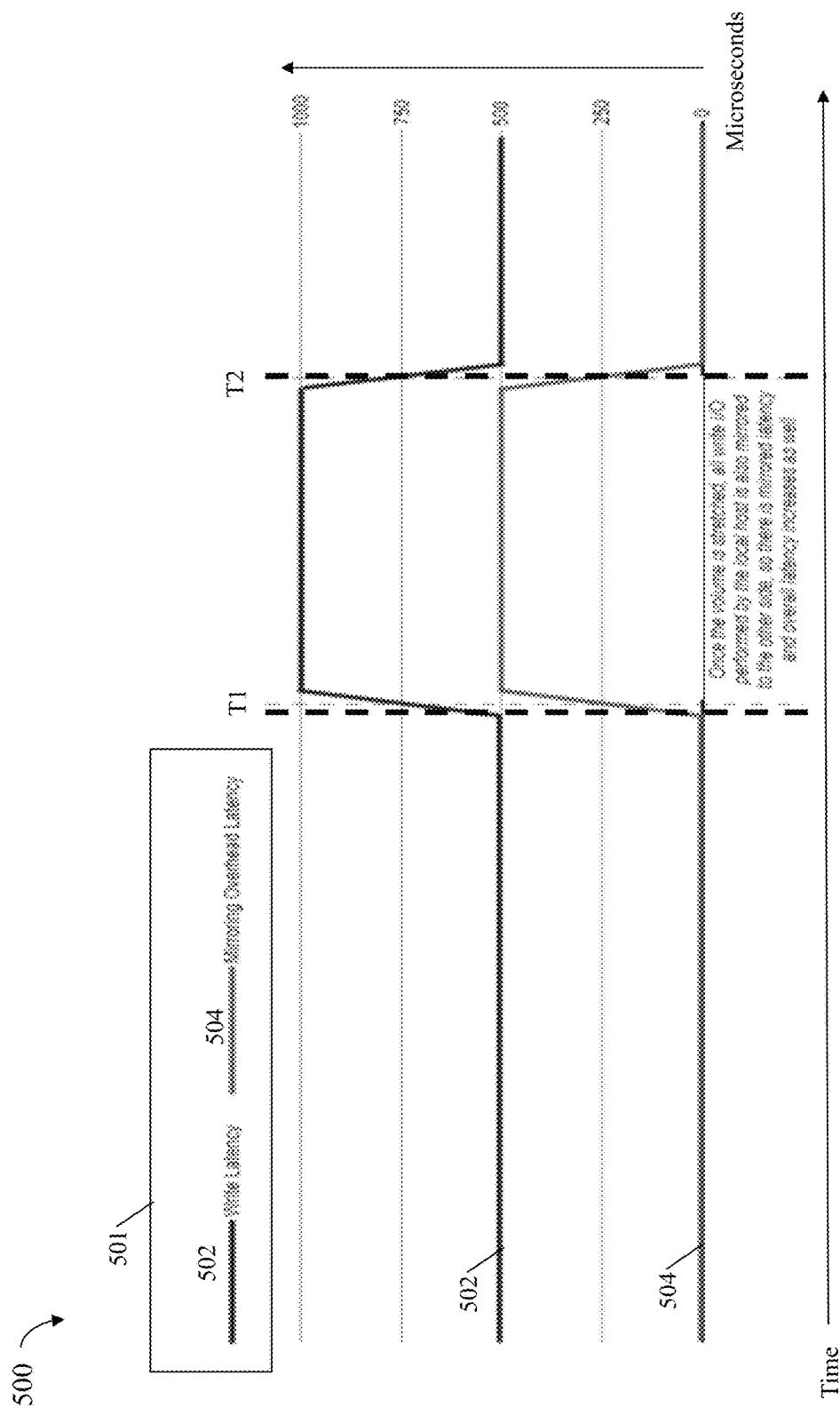
FIGS. 8, 9 10 and 11 are examples illustrating use of the metrics described herein in at least one embodiment.

Referring to FIG. 8, shown is an example illustrating use of two metrics at the individual storage resource level in at least one embodiment. The example 500 may be displayed and examined, for example, by the user or administrator.

The example 500 includes a key 501 indicating that the curve 502 denotes average write I/O latency for a volume or LUN, and the curve 504 denotes the average mirroring overhead latency for the same volume or LUN. The X axis denotes increasing time and the Y axis denotes the latency in microseconds. In this example, reference is made to FIG. 7A in connection with the LUN or volume A 425*a*. Prior to the time T1, the volume 425*a* may be configured as a local resource where the volume or LUN A 425*a* may be configured on only the system 410. Prior to the time T1, the LUN A 425*a* may also be characterized as an unstretched LUN configured on only the system 410.

The curve 502 denotes values across time for the metric average write I/O latency, as described in connection with 1b) above, for the LUN A 425*a*. The curve 504 denotes values across time for the metric average mirroring overhead latency, as described above in connection with 1a) above, for the LUN A 425*a*. Prior to the time T1, LUN A 425*a* is a local resource so the average mirroring overhead latency 504 prior to the time T1 is expected to be zero as illustrated in the example 500.

At the time T1, assume that the LUN A 425*a* is then stretched and configured as one of the volumes of a volume pair for the stretched LUN A as described above, such as in connection with FIG. 7A. Subsequent to the time T1, the LUN A 425*a* may be characterized as a stretched or metro resource. Also subsequent to the time T1 assume that writes to the volume 425*a* of the stretched LUN A are received so that all write I/Os performed by one or more local hosts are also mirrored from the local system 410 to the peer remote system 430. Thus, subsequent to the time T1, there is now mirroring overhead latency as denoted by the increase in latency of the curve 504 from the time T1 to the subsequent time T2. Additionally, the overall average write latency as denoted by the curve 502 also accordingly increases from the time T1 to the time T2 whereby the increase observed in the curve 502 from T1 to T2 is proportional to the increase observed in the curve 504 from T1 to T2.

Now, beginning with the second point in time T2, it may be observed that the mirroring overhead latency 504 drops to zero; and that the average write latency 502 also accordingly decreases. A manager or automated software component monitoring the values of the mirroring overhead latency 504 over time may note the foregoing drop to zero latency at the time T2 and also note that the volume 425*a* is configured as a volume of a stretched LUN (e.g., configured as a metro resource). In this case, the drop to zero latency by the curve 504 at the time T2 may indicate a network connectivity problem in connection with the synchronous replication of the writes performed for the stretched LUN A. In particular, the zero latency at the time T2 for the I curve 504 indicates that no write I/O data is being replicated (402) between the systems 410 and 430 denoting synchronous replication failure. Responsive to the zero latency for the curve 504 at the time T2 for the stretched LUN A, an alert, warning or error may be generated to denote the detected expected synchronous replication failure and one or more further actions may be taken to facilitate correcting the synchronous replication failure. In at least one embodiment when the manager is viewing the graphical display 500, the manager may further examine information regarding the status of the link(s) used for the synchronous replication to determine whether the link(s) between the systems 410, 430 are down.

Another possible cause for the above-noted synchronous replication failure as denoted by the drop to zero latency in the curve 504 at the time T2 may be due to the system 430 being offline or unavailable. The manager may further examine information regarding the status of the systems 410 and 430 to determine whether the system 430 is down and causing the replication failure. In at least one embodiment, software may be used to monitor the values of the latency of the curve 504 for the metro resource, volume 425a of the stretched LUN A, so that responsive to the latency value of zero in the curve 504 occurring at the time T2, an alert may be generated and one or more actions may be subsequently taken to further analyze and/or correct the failed synchronous replication detected.

Figure 9:
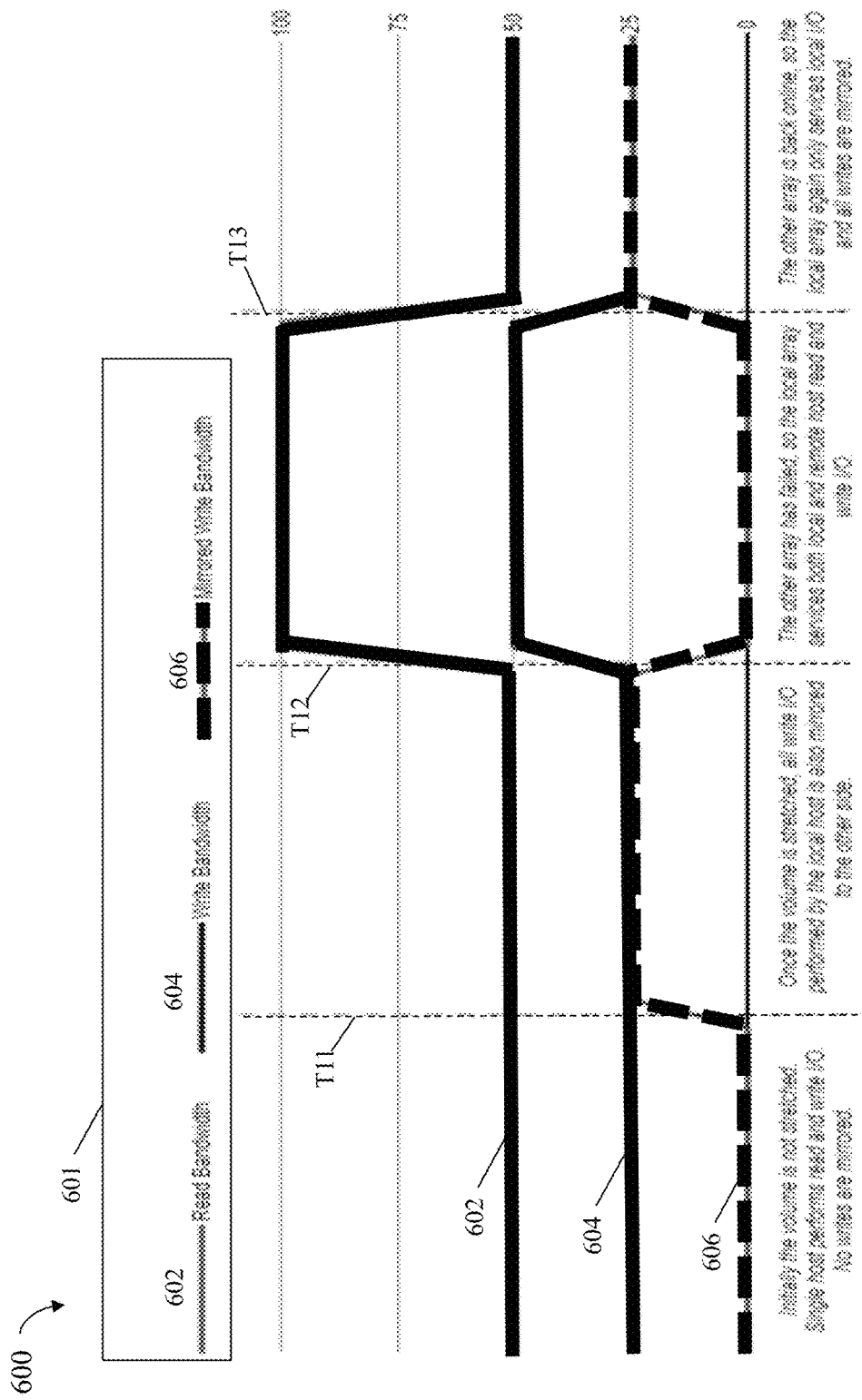

Referring to FIG. 9, shown is another example illustrating use of three metrics described herein at the individual metro resource level in an embodiment in accordance with the techniques herein. For illustration, the following description in connection with FIG. 9 is made with reference to the metro resource volume 425a of FIG. 7A.

The example 600 includes a key 601 indicating that the curve 602 denotes the average read bandwidth for the volume 425a, the curve 604 denotes the average write I/O bandwidth for the volume 425a, and the curve 606 denotes the mirrored write I/O bandwidth for the volume 425a. The X axis denotes increasing time and the Y axis denotes the bandwidth as MB/s (Megabytes per second).

In this example, reference is made to FIG. 7A in connection with the LUN or volume A 425a. The curve 602 denotes values across time for the metric read I/O bandwidth for read I/Os directed to the LUN A 425a. The curve 604 denotes values across time for the metric write I/O bandwidth as described in 1h) above for the volume 425a. The curve 606 denotes values across time for the metric mirrored write I/O bandwidth as described in 1d) above for the volume 425a.

Three events or actions occur respectively at the times T11, T12 and T13. The curves 602, 604 and 606 illustrate the behavior of the 3 metrics of 601 for the volume 425a over time. Prior to the time T11, the volume 425a may be configured as a local resource where the volume or LUN A 425a may be configured on only the system 410. Prior to the time T11, the LUN A 425a may also be characterized as unstretched and configured on only the system 410 where only the single local host 412 issues I/Os to the volume 425a.

Prior to the time T11, LUN A 425a is a local resource so the mirrored write bandwidth 606 prior to the time T1 is expected to be zero as illustrated in the example 600. At the time T11, assume that the LUN A 425a is then configured as one of the volumes of a volume pair for the stretched LUN A as described above, such as in connection with FIG. 7A. Subsequent to the time T11, assume that writes to the volume 425a of the stretched LUN A are received so that all write I/Os performed by the local host 412 are also mirrored from the local system 410 to the peer remote system 430. Thus, subsequent to the time T11, there is now a non-zero mirrored write bandwidth as denoted by the increase in latency of the curve 606 from the time T11 to the subsequent time T12. Thus, as long as the storage resource 425a is a local resource not configured as a metro resource (e.g., as prior to the time T11), the mirrored write bandwidth 606 remains at zero. As soon as the volume 425a is configured as a metro resource of the stretched LUN A at the time T11, the write I/O bandwidth 604 and the mirrored write bandwidth 606 are the same.

At the point in time T12, the remote system 430 fails so that the local system 410 services I/Os from both the hosts 412 and 432 between the times T12 and T13. Between the times T11 and T12, assume that the host 432 issues reads and writes to the metro resource volume 425b of the system 430. When the system 430 fails at the time T12, the configuration of FIG. 7A may change to that as illustrated in the FIG. 7B where the subsequent I/O workload form the host 432 is now directed to the system 410 along with the I/O workload of the host 412. Between the times T12 and T13, it may be observed that the write bandwidth 604 and the read bandwidth 602 directed to the metro resource volume 425a both increase to reflect the increased I/O workload on the system 410. Between the times T12 and T13, it is also noted that the mirrored write bandwidth drops to zero since no writes of the volume 425a are mirrored from the system 410 to the failed or offline system 430.

At the time T12, it may be observed that the mirrored write bandwidth 606 drops to zero. A manager or automated software component monitoring the values for 606 over time may note the foregoing drop to zero bandwidth at the time T12 and also note that the volume 425a is configured as a metro resource volume of a stretched LUN. In this case, the drop to zero bandwidth by the curve 606 at the time T12 may indicate a network connectivity problem in connection with the synchronous replication of the writes performed for the stretched LUN A. Alternatively, the drop to zero bandwidth by the curve 606 at the time T12 may indicate the remote system 430 has failed. Responsive to the zero bandwidth for the curve 606 at the time T12 for the volume 425a, an alert, warning or error may be generated to denote the detected expected synchronous replication failure or expected remote system 430 failure. In response to the manager viewing the drop to zero bandwidth by the curve 606 at the time T12, the manager may take one or more actions to facilitate further determining whether the cause for the drop to zero bandwidth by the curve 606 at the time T12 is due to a failed network replication connection 402 or a failed system 430. In at least one embodiment when the manager is viewing the graphical display 600, the manager may further examine information regarding the status of the link(s) used for the synchronous replication to determine whether the link(s) between the systems 410, 430 are down. The manager may further examine information regarding the status of the system 430 to determine whether the system 430 is down and causing the replication failure. In at least one embodiment, software may be used to monitor the values of the bandwidth of the curve 606 for the metro resource, volume 425a of the stretched LUN A, so that responsive to the bandwidth value of zero in the curve 606 occurring at the time T12, an alert may be generated and one or more actions may be subsequently taken to further analyze and/or correct the failed synchronous replication detected.

In this example 600, assume that the manager determines that the cause of the zero bandwidth of the curve 606 at the time T12 is due to failure of the system 430. Between the times T12 and T13, one or more actions may be taken to reboot the system 430 making it once again available online at the time T13. Subsequent to the time T13, the state of the metro cluster configuration may transition from the state illustrated in FIG. 7B to the state illustrated in the FIG. 7A. Subsequent to the time T13, the system 410 may once again return to only servicing I/Os from the host 412 and the system 430 may once again return to servicing I/Os from only the host 432. As illustrated by the values of the metrics of the curves 602, 604 and 606 for the volume 425a, the I/O workload of the volume 425a subsequent to the time T13 returns to the prior workload as denoted between the times T11 and T12.

An embodiment in accordance with the techniques herein may use a curve for the metric mirrored write IOPS for metro resources (e.g., as described by 2f) rather than the curve 606 to detect the event of the replication failure and/or remote system failure at the time T12. At the time T12, the mirrored write IOPS for the stretched LUN 425a would also drop to zero when there is no replication 402.

Figure 10:
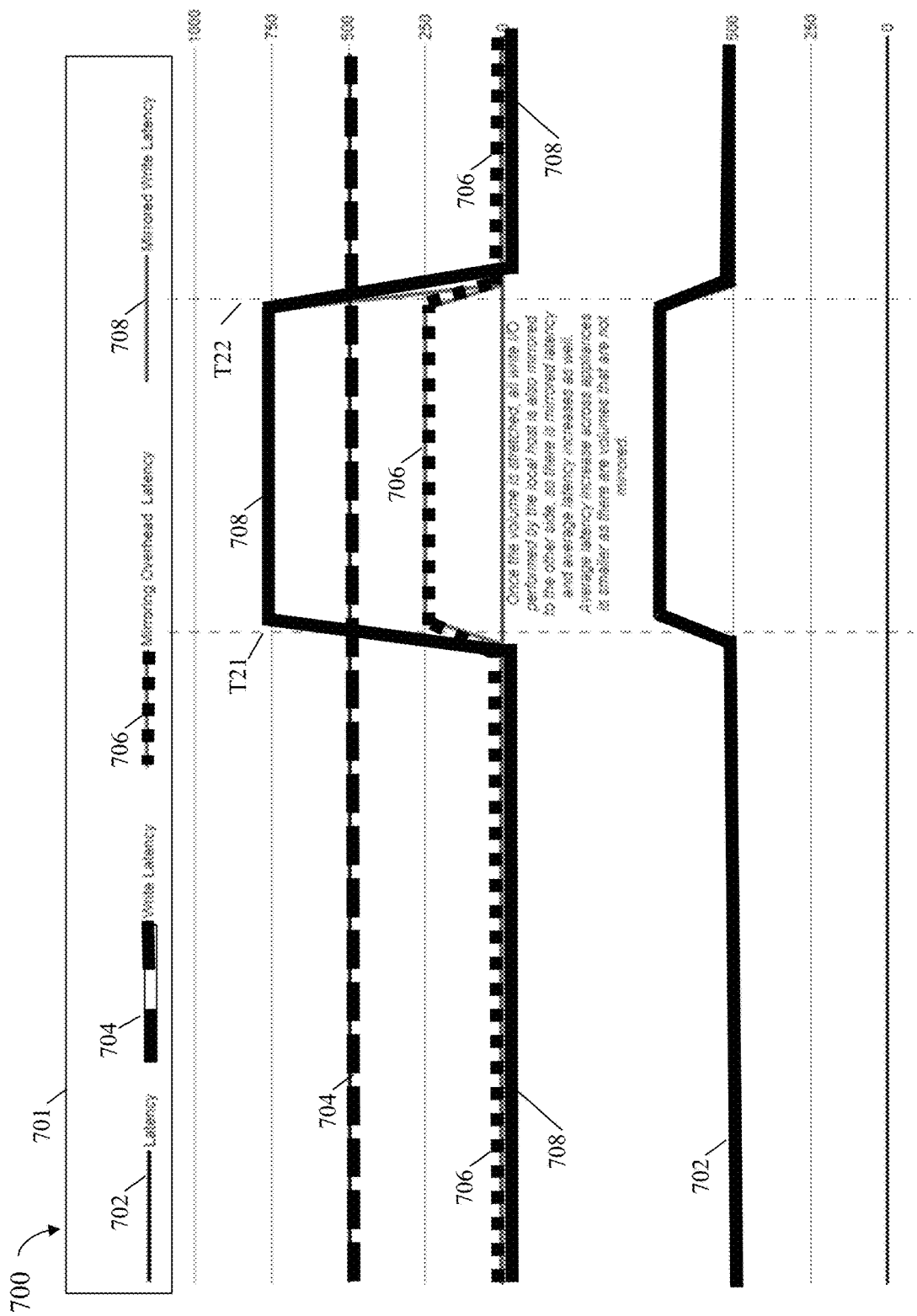
Figure 11:
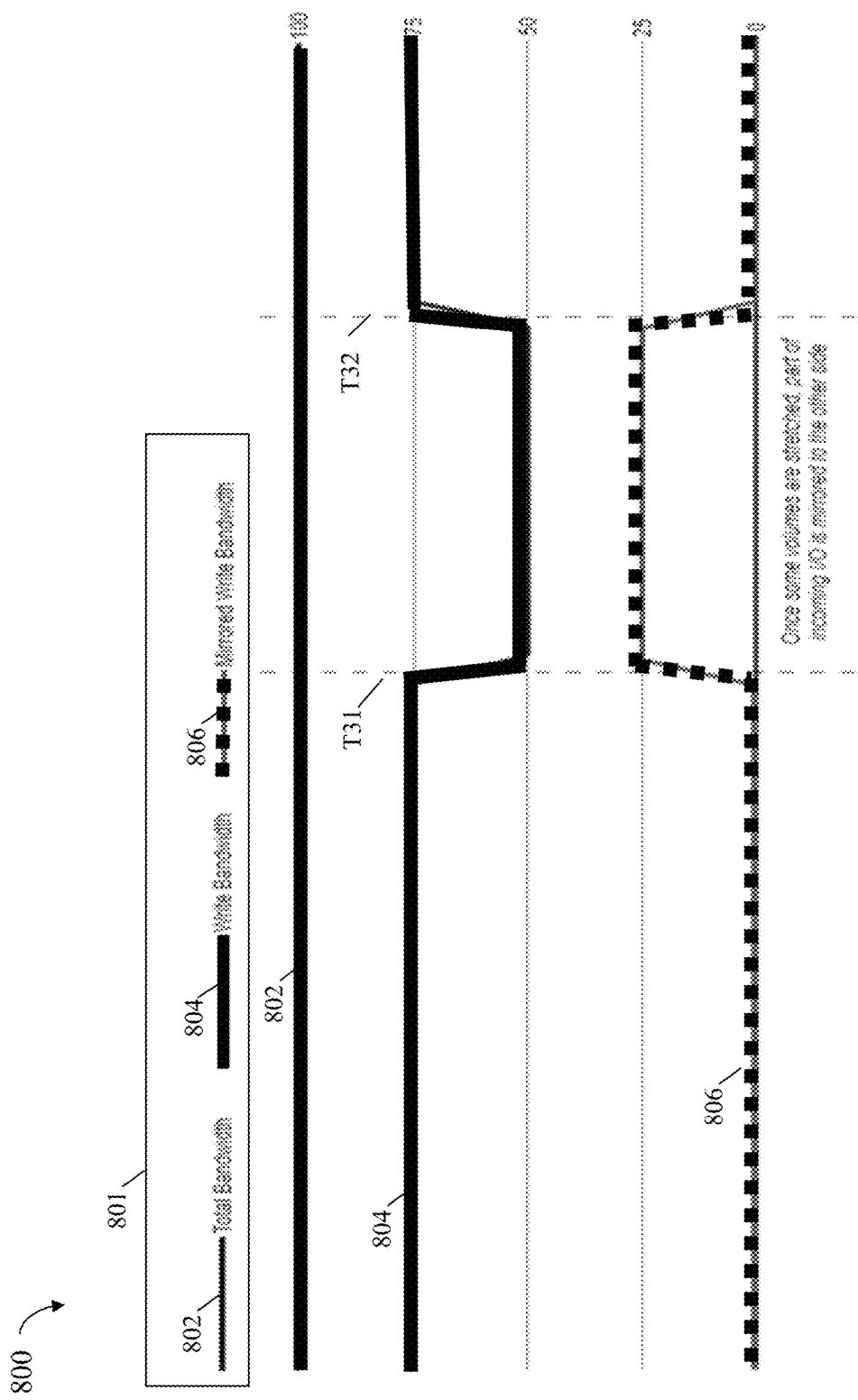

Described below in connection with the FIGS. 10 and 11 are examples using metrics described herein at the storage appliance node level, the storage appliance level, the storage cluster or federation level, and the metro cluster level in an embodiment in accordance with the techniques herein. In at least one embodiment, at the node level, the appliance level, the storage cluster or federation level, and the metro cluster level, metrics may be used that represent aggregated information for multiple resources, such as multiple local resources and/or multiple metro resources. In at least one embodiment at the node level, the appliance level, the storage cluster or federation level, and the metro cluster level, a first average write latency metric (e.g., as described in connection with 2b)) may be provided for local resources, and a second average write latency metric (e.g., average mirrored write latency as described in connection with 2h)) may be provided for metro resources. In at least one embodiment at the node level, the appliance level, the storage cluster or federation level, and the metro cluster level, a first write I/O bandwidth metric (e.g., as described in connection with 2i)) may be provided for local resources and a second write I/O bandwidth metric (e.g., mirrored write bandwidth as described in connection with 2d)) may be provided for metro resources. In at least one embodiment at the node level, the appliance level, the storage cluster or federation level, and the metro cluster level, a first write IOPS metric (e.g., as described in connection with 2j)) may be provided for local resources and a second write IOPS metric (e.g., mirrored write IOPS as described in connection with 2f)) may be provided for metro resources.

Referring to FIG. 10, shown is another example illustrating use of four metrics at the appliance or system level in an embodiment in accordance with the techniques herein. Generally, the example 700 described below is with respect to appliance level metrics denoting an aggregation of workload across multiple volumes or resources as opposed to a single resource such as a single metro resource. Although the following description in connection with FIG. 10 is with respect to appliance level metrics, more generally, the charts of the 4 metrics of FIG. 10 are similar for the node level, the storage cluster or federation level, and the metro cluster level. Thus, the techniques and description below in connection with FIG. 10 may also be applied for use with the 4 metrics at the node level, the storage cluster or federation level, and the metro cluster level. For purposes of illustration, the 4 metrics of FIG. 10 are described below at the appliance level with respect to the appliance or system 410 of FIG. 7A.

The example 700 includes a key 701 indicating that the curve 702 denotes the average I/O latency for the system 410, the curve 704 denotes the average write I/O latency for the system 410, the curve 706 denotes the average mirroring overhead latency for the system 410, and the curve 708 denotes the average mirrored write latency for the system 410. The X axis denotes increasing time and the Y axis denotes the latency such as in microseconds. The curve 702 denotes values across time for the metric average I/O latency at the appliance level for the system 410 as described in 2c) above. The curve 704 denotes values across time for the metric average write I/O latency for all local resources at the appliance level for the system 410 as described in 2b) above. The curve 706 denotes values across time for the metric average mirroring overhead latency at the appliance level for the system 410 as described in 2a) above. The curve 708 denotes values across time for the metric average mirrored write latency for metro resources at the appliance level for the system 410 as described in 2h) above.

In at least one embodiment, a manager may be viewing the information of FIG. 10 and observe that the average I/O latency denoted by the curve 702 increases at the time T21. Consistent with other discussion herein, in at least one embodiment, the average I/O latency may be expected to be stable or approximately the same (within a specified tolerance or variation) over time. Otherwise, there may be a problem at points in time when the average I/O latency increases and exceeds the allowable tolerance or variation). For example, there may be a problem with the network such as due to network congestion due to one or more failed links or connections between the host and data storage systems or appliances. In the example 700, the average I/O latency denoted by 702 at the time T21 may exceed a specified tolerance or variance. In response, the manager may perform further analysis to determine the cause of the increase in the average I/O latency at the time T21 and whether the increase is due to expected events or whether the increase is due to an existing problem requiring further corrective action.

The further analysis may include the manager viewing the write latency metric for the system 410 over time as denoted by the curve 704. The curve 704 indicates that the write latency for local resources of the system 410 is stable or approximately the same (within a specified tolerance or variation) over time thereby indicating the system 410 is not experiencing any problems with write I/Os received at the system 410 for local resources. It may be observed that prior to the time T21, the system 410 does not have any configured metro resources or stretched LUNs since the latency prior to the time T21 for the curves 706 and 708 is zero. However, at the time T21, it may be observed that the latency denoted by the curves 706 and 708 increases thereby indicating that one or more local volumes of the system 410 are now stretched and configured as metro resources at the time T21. Once such volumes are stretched and configured as metro resources of stretched LUNs, all write I/Os received for the volumes at the system 410 are replicated to the system 430 thereby increasing the average mirroring overhead latency 706, increasing the average mirrored write latency 708, and also increasing the average I/O latency 702.

It should be noted that the average I/O latency increase denoted by the curve 702 at the time T21 is smaller than the increase in latency at the time T21 denoted by the curves 706 and 708. The foregoing is due to the overall average I/O latency metric denoted by the curve 702 being determined across both local resources (for which writes are not replicated or mirrored) and metro resources (for which writes are replicated to the remote system 430).

A manager or user viewing the example 700 may observe at the time T22 that the mirroring overhead latency 706 and the mirrored write latency 708 are zero thereby indicating that there is no replication of write I/O data from the system 410 to the system 430. In response, the manager or user may further investigate the cause of the latencies of the curves 706 and 708 dropping to zero and determine whether the cause of the zero latencies at T22 is due to a problem. For example, the latencies denoted by the curves 706 and 708 may drop to zero at the time T22 due to a network failure of the link(s) used for synchronous replication 402 or due to a failure of the system 430. If the cause of the latency curves 706 and 708 at the time T22 dropping to zero is due to failure of the replication link(s) 402, a corrective action may be performed to restore, repair or replace the failed network link(s) used for synchronous replication 402. If the cause of the latency curves 706 and 708 at the time T22 dropping to zero is due to failure of the remote system 430, a corrective action may be performed to restore, repair and/or reboot the remote system 430. If the cause of the latency curves 706 and 708 at the time T22 dropping to zero is due to a valid configuration change, such as due to stretched volumes or LUNs, or more generally metro resources, being reconfigured as unstretched volumes or LUNs (e.g., local resources), then no corrective action is needed since removal of all stretched LUNs or metro resources means that there should be no synchronous replication of write I/O data between the systems 410 and 430.

An embodiment in accordance with the techniques herein may use a curve for the metric mirrored write IOPS for metro resource (e.g., as described by 2f) rather than the curve 708 to detect the event of the replication failure at the time T22. At the time T22, the mirrored write IOPS for stretched volumes or metro resources would also drop to zero when there is no replication 402.

Referring to FIG. 11, shown is another example illustrating use of three metrics at the appliance or system level in an embodiment in accordance with the techniques herein. Generally, the example 800 described below is with respect to appliance level metrics denoting an aggregation of workload across multiple volumes or resources as opposed to a single resource such as a single metro resource. Although the following description in connection with FIG. 11 is with respect to appliance level metrics, more generally, the curves for the metrics of FIG. 11 may be similar for the node level, the storage cluster or federation level, and the metro cluster level. Thus, the techniques and description below in connection with FIG. 11 may also be applied for use with the three metrics at the node level, the storage cluster or federation level, and the metro cluster level. For purposes of illustration, the metrics of FIG. 11 are described below at the appliance level with respect to the appliance or system 410 of FIG. 7A.

The example 800 includes a key 801 indicating that the curve 802 denotes the average total I/O bandwidth for the system 410, the curve 804 denotes the write I/O bandwidth for unstretched local resources of the system 410, and the curve 806 denotes the average mirrored write I/O bandwidth for metro resources (e.g., resources configured for use with stretched LUNs) for the system 410. The X axis denotes increasing time and the Y axis denotes the bandwidth as MB/s (Megabytes per second).

The curve 802 denotes values across time for the metric total I/O bandwidth at the appliance level for the system 410 as described in 2g) above. The total I/O bandwidth 802 may denote 100% of the I/O bandwidth or workload of the system 410. The curve 804 denotes values across time for the metric write I/O bandwidth for all local resources (e.g., non-stretched resources) at the appliance level for the system 410 as described in 2i) above. The curve 806 denotes values across time for the metric mirrored write I/O bandwidth at the appliance level for the metro resources of the system 410 as described in 2d) above.

In the time period prior to T31, the system 410 does not include any metro resources and there is no write I/O synchronous replication (402) to the system 430 as denoted by the zero bandwidth for the mirrored write I/O bandwidth curve 806 during the time period prior to T31. The total I/O bandwidth 802 may denote the I/O bandwidth from host I/Os received by the appliance. In the time period prior to T31, the total I/O bandwidth 802 is solely due to host I/Os received at the system 410 where such host I/Os are directed to local resources of the system 410. At the time T31, multiple volumes of the system 410 may be configured as stretched and transition to metro resources. Between the times T31 and T32, host write I/Os directed to the metro resources, such as the stretched LUNs of the system 410, are synchronously replicated from the system 410 to the system 430. The synchronous replication of the write I/Os during the time period T31 to T32 is denoted by the increased non-zero bandwidth of the curve 806 during the time period T31 to T32. Since the total I/O bandwidth 802 is defined by the received host I/Os, as the mirrored write I/O bandwidth 806 increases, the write I/O bandwidth 804 may accordingly decrease. In a similar manner, as the mirrored write I/O bandwidth 806 decreases, the write I/O bandwidth 804 may accordingly increase. The sum of the workloads denoted collectively by the curves 804 and 806 at any single point in time may denote the total host write I/O bandwidth at that single point in time. It may be assumed in connection with the FIG. 11 that the total host write I/O bandwidth remains relatively constant or the same across time for the window of time displayed in the example 800. Assuming that that the total host write I/O bandwidth remains relatively constant or the same across time, prior to T31, the curve 804 denotes the total host write I/O bandwidth since prior to T31, no volumes or resources of the system 410 are configured as stretched or metro resources (e.g., as denoted by the curve 806 having a value of zero prior to the time T31). Beginning with the time T31 when a portion of the resources or volumes are now stretched, the write I/O bandwidth directed to these stretched metro resources is now accounted for in the curve 806 rather than the curve 804.

In at least one embodiment, a manager may be viewing the information of FIG. 11 and observe that the mirrored write I/O bandwidth denoted by the curve 806 decreases at the time T32 drops to zero thereby indicating that there is no replication of write I/O data from the system 410 to the system 430. Responsive to the mirrored write I/O bandwidth denoted by the curve 806 dropping to zero at the time T32, the manager or user may further investigate the cause of the bandwidth of the curve 806 dropping to zero and determine whether the cause of the zero mirrored write I/O bandwidth at the time T32 is due to a problem. For example, the mirrored write I/O bandwidth may drop to zero at the time T32 due to a network failure of the link(s) used for synchronous replication 402 or due to a failure of the system 430. If the cause of the mirrored write I/O bandwidth at the time T32 dropping to zero is due to failure of the replication link(s) 402, a corrective action may be performed to restore, repair or replace the failed network link(s) used for synchronous replication 402. If the cause of the mirrored write I/O bandwidth at the time T32 dropping to zero is due to failure of the remote system 430, a corrective action may be performed to restore, repair and/or reboot the remote system 430. The cause of the mirrored write I/O bandwidth at the time T32 may also be due to a valid configuration change, such as due to the stretched volumes or LUNs, or more generally metro resources, being reconfigured as unstretched volumes or LUNs (e.g., local resources). In this latter case due to the valid configuration change where there are no longer any configured metro resources (e.g., no stretched LUNs), then no corrective action is needed since removal of all stretched LUNs or metro resources means that there should be no synchronous replication of write I/O data between the systems 410 and 430 (e.g., the mirrored write I/O bandwidth 806 is expected to be zero when there are no metro resources in the system 410).

An embodiment in accordance with the techniques herein may use a curve for the metric mirrored write IOPS for metro resources (e.g., as described by 2f) rather than the curve 806 to detect the event of the replication failure at the time T32. For example, at the time T32, the mirrored write IOPS for stretched volumes or metro resources would also drop to zero when there is no replication 402.

In at least one embodiment, the I/O operations analyzed in connection with the metrics described herein may be those from external hosts or clients. In some embodiments, internal data storage system components may generate additional I/Os internally within the data storage system where the internally generated I/Os may or may not be analyzed in connection with the metrics described herein. In at least one embodiment, a configurable option may allow a user to select one or more particular categories of I/Os to include in connection with determining the metrics described herein. For example, in at least one embodiment, a configurable option may allow a user to select whether the metrics described herein include only externally generated I/Os such as from external hosts or clients, whether the metrics described herein include only data storage system internally generated I/Os, or whether the metrics described herein include both of the foregoing externally and internally generated I/Os.

What will now be described is an example of processing flow that may be performed in connection with determining the average mirroring overhead latency (e.g., as described in 2a)), the average mirrored write I/O latency (e.g., as described in 2b)), the mirrored write I/O bandwidth (e.g., as described in 2d)) and the mirrored write IOPS (e.g., as described in 2f)) metrics in at least one embodiment in accordance with the techniques herein.

An example of the components and general architecture of a metro cluster as well as a storage cluster or federation of systems is described, for example, with reference to FIGS. 2, 6, 7A and 7B. With reference back to FIG. 2 and consistent with other discussion herein, the front end (FE) component 106a on each node may be a driver or module that receives and processes FE protocol commands such as, for example, in accordance with the SCSI and/or NVMe protocols.

In at least one embodiment, the mgt SW 411 may denote a software component that manages the appliance or system 410, and the mgt SW 413 may denote a software component that manages the appliance or system 430. The mgt SW 411 manages components on both nodes 410a-b of the system 410, and the mgt SW 413 manages components on both nodes 430a-b of the system 430. In at least one embodiment, the mgt SW component 411 may run on a selected single node 410a or 410b of the system 410. If the selected node of the system 410 fails, the mgt SW component 411 may then failover and run on the remaining healthy peer node of the system 410. Similarly, the mgt SW component 413 may run on a selected single node 430a or 430b of the system 430. If the selected node of the system 430 fails, the mgt SW component 413 may then failover and run on the remaining healthy peer node of the system 430.

In at least one embodiment, each of the mgt SW components 411, 413 may have a first API that may be used by another management level of the control path to send configuration information, updated status information, and other management or control path information to the components 411, 413. Additionally, in such an embodiment, each of the mgt SW components 411, 413 may have a second API that the components 411, 413 use to communicate with other components of their respective appliance nodes. For example, the second API may be used by a component (e.g., FE component) of the node 410a to send information to and/or receive information from the mgt SW 411 of the system 410. As another example, the second API may be used by a component (e.g., FE component) of the node 430b to send information to and/or receive information from the mgt SW 413 of the system 430.

In at least one embodiment, the CMA 401a may communicate with each of the mgt SW components 411, 413 to provide the various levels described herein including a metro cluster level or federation level management of the two systems 410, 430. In at least one embodiment, the CMA 401a may provide a management GUI to present metrics as described herein as well as other information to a user of the CMA 401a. For example, the management GUI of the CMA 401a may display the information graphically as described and illustrated in connection with FIGS. 8, 9 10 and 11. In at least one embodiment, the CMA 401a may execute on a selected one of the appliances or systems 410, 430. If the selected system should fail, the CMA 401a may failover and execute on the remaining healthy one of the two systems 410, 430. The data storage system 410 as illustrated includes only a single dual node appliance, and also the data storage system 430 as illustrated includes only a single dual node appliance. More generally, any one or both of the components 410 and 430 may each include multiple appliances where each such appliance may include multiple nodes. For example, the data storage system 410 may include a first group of multiple dual node appliances configured as a first storage cluster or federation where all appliances of the first group may be collectively managed using the Mgt SW A 411. The data storage system 430 may include a second group of multiple dual node appliances configured as a second storage cluster or federation where all appliances of the second group may be collectively managed using the Mgt SW B 413.

Consistent with other discussion herein, in a first step S1, the FE component of a node receives a write operation such as from a host or other external client. In at least one embodiment, the FE component may create an I/O request data structure for the write I/O operation received. An instance of the FE component may execute on each node of the systems 410, 430. Consistent with discussion herein, the write I/O represented by the I/O request may be for a stretched or metro resource such as, for example, the stretched volume 425a for the stretched LUN A. Alternatively, the write I/O represented by the I/O request may be for an unstretched or local resource such as, for example, an unstretched volume or LUN B existing on only the system 410. Subsequently, following the step S1 in a step S2, the FE component may pass the I/O request for the write I/O operation to the data path.

In at least one embodiment, the data path processing may be performed by a data path module that services I/O requests received from external hosts or clients and also received from internal containers. Each node of each of the systems 410, 430 may include an instance of the data path module for servicing I/Os. The data path module may perform processing to service I/O requests as described elsewhere herein. In the step S2, the data path module receives the I/O request for the write I/O operation and performs the necessary processing to service the write I/O operation. In the step S2, processing is performed to service the write operation. The processing of the step S2 may include determining whether the write I/O operation is directed to a stretched metro resource, such as the volume 425a, or whether the write I/O operation is directed to an unstretched local resource, such as the unstretched volume or LUN B on the system 410.

If the write I/O is directed to an unstretched local resource, the data path processing of the step S2 includes storing the write I/O operation data in the cache of the system 410. The cache write data is subsequently persistently stored on BE PDs providing non-volatile storage.

If the write I/O is directed to a stretched metro resource, such as the volume 425a, the data path processing of the step S2 includes storing the write I/O operation data in the cache of the system 410. The cache write data is subsequently persistently stored on BE PDs providing non-volatile storage. Also in the step S2, processing performed by the data path to service the write I/O operation to the stretched metro resource includes synchronously replicating the write I/O to the peer remote system 430. In at least one embodiment in accordance with the techniques herein, the mirroring overhead latency for the write I/O operation may be measured as the amount of time to synchronously replicate the write I/O operation to the system 430. A timer may be started on the system 410 prior to synchronously replicating the write I/O to the system 430. The timer may be stopped on the system 410 after the write I/O operation has been synchronously replicated to the system 430 such as, for example, when the system 410 receives an acknowledgement from the system 430 acknowledging receipt of the replicated write I/O operation. The amount of time measured by the timer may denote the mirroring overhead latency for that single write I/O operation.

In at least one embodiment, the I/O request data structure may include: a first property that is set by the data path in the step S2 to indicate whether or not the write I/O was replicated to the peer system 430; and a second property denoting the measured mirroring overhead latency as measured by the timer noted above. It should be noted that the second property is only set to a measured value if the first property indicates that the write I/O processed is directed to a stretched metro resource whereby the write I/O was replicated to the peer system.

In a step S3 following the step S2, information regarding the write I/O may be communicated to the mgt SW of the appliance or system that received the write I/O. For example, if the write I/O is received by the node 410a, information regarding the write I/O is collected by the mgt SW 411 and used in connection with maintaining the various metrics described herein.

In at least one embodiment, the mgt SW components 411, 413 may manage the following counters, as well as other metrics described herein, at the resource level, node level, appliance level, and (if applicable) the storage cluster or federation level: the average mirroring overhead latency (e.g., as described in 2a)), the average mirrored write I/O latency (e.g., as described in 2b)), the mirrored write I/O bandwidth (e.g., as described in 2d)) and the mirrored write IOPS (e.g., as described in 2f)) metrics.

Periodically, the control path may retrieve the various counters maintained by the mgt SW 411, 413 respectively, of the systems 410, 430 to determine metrics described herein at the metro cluster level. In at least one embodiment, the storage cluster level or federation level metrics may be persistently stored in databases such as, for example, each of the databases 411a, 413a respectively, of the systems 410, 430. In at least one embodiment, the metro cluster level metrics may be persistently stored in a database such as, for example, one of more of the databases 411a, 413a respectively, of the systems 410, 430. The CMA 401a may present through its management GUI charts or graphs of the requested metrics as described herein.

Figure 12:
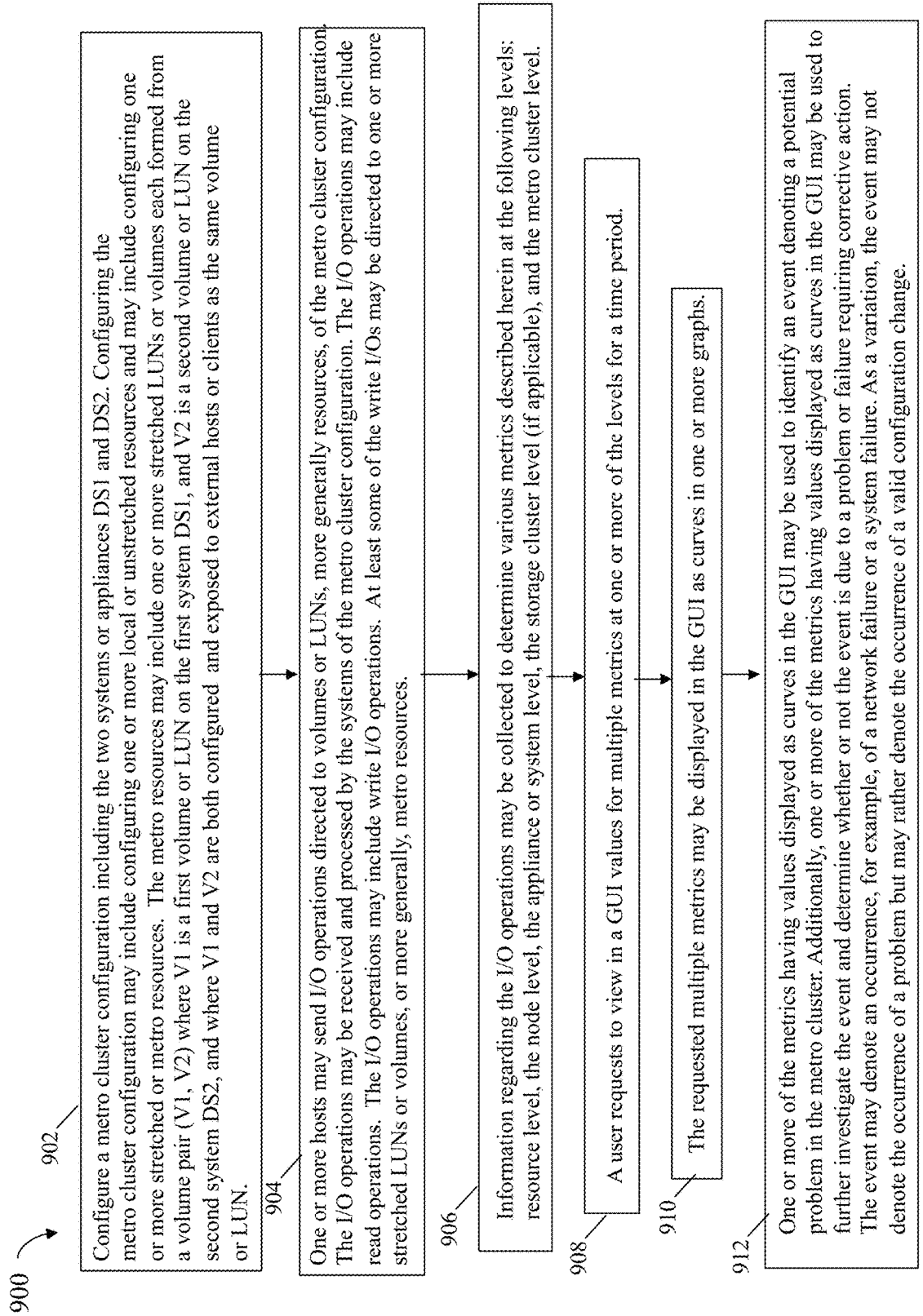
FIG. 12 is a flowchart of processing steps that may be performed in at least one embodiment in accordance with the techniques herein.

Referring to FIG. 12, shown is a flowchart 900 of processing steps that may be performed in an embodiment in accordance with the techniques herein. The flowchart 900 generally summarizes processing described above.

At a step 902, processing may be performed to configure a metro cluster configuration including two systems or appliances, DS1 and DS2. An example of a metro cluster configuration is described herein, for example, in connection with FIGS. 7A and 7B. Configuring the metro cluster configuration in the step 902 may include configuring one or more local or unstretched resources and may include configuring one or more stretched or metro resources. The metro resources may include one or more stretched LUNs or volumes each formed from a corresponding volume pair (V1, V2), where V1 is a first volume or LUN on the first system DS1, and V2 is a second volume or LUN on the second system DS2, and where V1 and V2 are both configured with the same identity and exposed to external hosts or clients as the same volume or LUN. From the step 902, processing proceeds to a step 904.

At the step 904, one or more hosts may send I/O operations directed to volumes or LUNs, more generally resources, of the metro cluster configuration. The I/O operations may be received and processed by the systems of the metro cluster configuration. The I/O operations may include read operations. The I/O operations may include write I/O operations. At least some of the write I/Os may be directed to one or more stretched LUNs or volumes, or more generally, metro resources. From the step 904, processing proceeds to a step 906.

At the step 906, information regarding the I/O operations may be collected to determine various metrics described herein at the following 5 levels: the resource level, the node level, the appliance or system level, the storage cluster level or federation level (e.g., if applicable such as where multiple appliances are configured as a single storage cluster or federation whereby the single storage cluster or federation of appliances may also be characterized as a single storage system comprising multiple appliances), and the metro cluster level. From the step 906, processing proceeds to a step 908.

At the step 908, a user requests to view in a GUI of the management application, such as the CMA 401 of FIG. 7A, values for multiple metrics at one or more of the levels for a time period. From the step 908, processing proceeds to a step 910, At the step 910, the requested multiple metrics may be displayed in the GUI as curves in one or more graphs. From the step 910, processing proceeds to a step 912.

At the step 912, one or more of the metrics having values displayed as curves in the GUI may be used to identify an event denoting a potential problem in the metro cluster. Additionally, one or more of the metrics having values displayed as curves in the GUI may be used to further investigate the event and determine whether or not the event is due to a problem or failure requiring corrective action. The event may denote an occurrence, for example, of a network failure or a system failure. As a variation, the event may not denote the occurrence of a problem but may rather denote the occurrence of a valid configuration change.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of performing data storage management comprising:
configuring a stretched volume in a metro cluster configuration including a first data storage system, DS1, and a second data storage system, DS2, wherein the stretched volume is configured using a first volume, V1, on DS1 and a second volume, V2, on DS2, wherein V1 and V2 are configured as a same logical volume, L1, and exposed to a host as the same logical volume, L1, over a plurality of paths including a first path, P1, and a second path, P2, wherein P1 is between the host and DS1, and wherein P2 is between the host and DS2;
receiving a plurality of I/O operations at the metro cluster configuration directed to the same logical volume L1, wherein the plurality of I/O operations includes a first plurality of write operations that are received at DS1 and that write first data to V1;
viewing values of one or more metrics regarding data replication performed for V1 at a plurality of points in time, wherein the data replication is from DS1 to DS2 to replicate the first data written by the first plurality of write operations whereby the replicated first data is subsequently written to V2 on DS2, wherein the one or more metrics include at least one of: an average mirroring overhead latency for V1 indicating latency experienced when performing the data replication that replicates writes directed to V1 from DS1 to DS2, a mirrored write I/O rate denoting a number of write I/O operations in a specified unit of time for write I/Os that are directed to V1 and replicated from DS1 to DS2, and an average mirrored write I/O bandwidth denoting an I/O bandwidth for write data transmitted when replicating write I/Os directed to V1 from DS1 to DS2;
responsive to said viewing, determining whether one or more of the values of the one or more metrics denote that a problem has occurred in the metro cluster configuration at a first of the plurality of points in time; and
responsive to determining that the problem has occurred at the first point in time, performing one or more corrective actions.

2. The method of claim 1, further comprising:
responsive to determining that the one or more values for the one or more metrics indicate that write data directed to V1 is not being replicated from DS1 to DS2 at corresponding points in time, determining that the problem that has occurred at the first point in time is replication failure when replicating write data directed to V1 from DS1 to DS2 since, at the first point in time, V1 is stretched and included in a configuration for the stretched volume.

3. The method of claim 2, wherein the one or more corrective actions performed in response to determining that the problem is replication failure where write data directed to V1 is not being replicated from DS1 to DS2 include one or more of: placing DS2 back online, rebooting DS2, and fixing or replacing a failed link used for replicating data from DS1 to DS2.

4. The method claim 1, wherein V1 and V2 are configured for synchronous data replication, wherein the data replication performed for V1 at the plurality of points in time is synchronous data replication, and wherein the one or more metrics are regarding synchronous data replication performed for V1.

5. A method of performing data storage management comprising:
configuring a stretched volume in a metro cluster configuration including a first data storage system, DS1, and a second data storage system, DS2, wherein the stretched volume is configured using a first volume, V1, on DS1 and a second volume, V2, on DS2, wherein V1 and V2 are configured as a same logical volume, L1, and exposed to a host as the same logical volume, L1, over a plurality of paths including a first path, P1, and a second path, P2, wherein P1 is between the host and DS1, and wherein P2 is between the host and DS2;
receiving a plurality of I/O operations at the metro cluster configuration directed to the same logical volume L1, wherein the plurality of I/O operations includes a first plurality of write operations that are received at DS1 and that write first data to V1;
viewing values of a first metric regarding data replication performed for V1 at a plurality of points in time, wherein the data replication is from DS1 to DS2 to replicate the first data written by the first plurality of write operations whereby the replicated first data is subsequently written to V2 on DS2;
responsive to said viewing, determining whether one or more of the values of the first metric denote that a problem has occurred in the metro cluster configuration at a first of the plurality of points in time; and
responsive to determining that the problem has occurred at the first point in time, performing one or more corrective actions, wherein at the first point in time, V1 is configured as an unstretched or local resource and not included in the configuration of the stretched volume, and wherein the method further comprises:
responsive to determining that the one or more values for the first metric indicate that write data directed to V1 is not being replicated from DS1 to DS2 at corresponding points in time, determining that the one or more values of the first metric are due to a valid configuration change and do not denote an occurrence of the problem in the metro cluster configuration since, at the first point in time, V1 is unstretched and not included in the configuration for the stretched volume.

6. A non-transitory computer readable medium comprising code stored thereon that, when executed, performs a method of performing data storage management comprising:
   configuring a plurality of stretched volumes in a metro cluster configuration including a first data storage system, DS1, and a second data storage system, DS2, wherein each stretched volume of the plurality of stretched volumes is configured using a corresponding one of a plurality of volume pairs, wherein each of the plurality of volume pairs for one of the plurality of stretched volumes is configured as one of a plurality of logical volumes, wherein said each volume pair includes a first volume, V1, on DS1 and a second volume, V2, on DS2, wherein V1 and V2 are configured as said one logical volume, and exposed to a host as said one logical volume, over a plurality of paths including a first path, P1, and a second path, P2, wherein P1 is between the host and DS1, and wherein P2 is between the host and DS2;
   receiving a plurality of I/O operations at the metro cluster configuration directed to the plurality of stretched volumes;
   viewing values of one or more metrics regarding data replication performed for V1 at a plurality of points in time, wherein the data replication is from DS1 to DS2 to replicate the first data written by the first plurality of write operations whereby the replicated first data is subsequently written to V2 on DS2, wherein the one or more metrics include at least one of: an average mirroring overhead latency for the plurality of stretched volumes indicating latency experienced when performing the data replication that replicates writes directed to the plurality of stretched volumes from DS1 to DS2; a mirrored write I/O rate denoting a number of write I/O operations in a specified unit of time for write I/Os that are directed to the plurality of stretched volumes and replicated from DS1 to DS2; an average mirrored write I/O bandwidth denoting an I/O bandwidth for write data transmitted when replicating write I/Os, that are directed to the plurality of stretched volumes, from DS1 to DS2; and an average mirrored write I/O latency for write I/Os that are directed to the plurality of stretched volumes and are replicated from DS1 to DS2;
   responsive to said viewing, determining whether one or more of the values of the one or more metrics denote that a problem has occurred in the metro cluster configuration at a first of the plurality of points in time; and
   responsive to determining that the problem has occurred at the first point in time, performing one or more corrective actions.

7. The non-transitory computer readable medium of claim 6, wherein the one or more metrics include a first metric which is at a node level for a first node of one of DS1 and DS2, and wherein the first metric is determined in accordance with I/O operations received only at the first node.

8. The non-transitory computer readable medium of claim 6, wherein the one or more metrics include a first metric which is at an appliance level or a storage cluster level for a selected one of DS1 and DS2, and wherein the first metric is determined in accordance with I/O operations received only at the selected one of DS1 and DS2.

9. The non-transitory computer readable medium of claim 6, wherein the one or more metrics include a first metric which is at a metro cluster level, and wherein the first metric is determined in accordance with I/O operations received by both DS1 and DS2.

10. The non-transitory computer readable medium of claim 6, wherein the method further comprises:
    responsive to determining that the one or more values for the one or more metrics indicate that write data is not being replicated from DS1 to DS2 at corresponding points in time, determining that the problem that has occurred at the first point in time is replication failure when replicating write data directed from DS1 to DS2 since, at the first point in time, the plurality of stretched volumes are configured.

11. The non-transitory computer readable medium of claim 10, wherein the one or more corrective actions performed in response to determining that the problem is replication failure where write data is not being replicated from DS1 to DS2 include one or more of: placing DS2 back online, rebooting DS2, and fixing or replacing a failed link used for replicating data from DS1 to DS2.

12. A non-transitory computer readable medium comprising code stored thereon that, when executed, performs a method of performing data storage management comprising:
    configuring a plurality of stretched volumes in a metro cluster configuration including a first data storage system, DS1, and a second data storage system, DS2, wherein each stretched volume of the plurality of stretched volumes is configured using a corresponding one of a plurality of volume pairs, wherein each of the plurality of volume pairs for one of the plurality of stretched volumes is configured as one of a plurality of logical volumes, wherein said each volume pair includes a first volume, V1, on DS1 and a second volume, V2, on DS2, wherein V1 and V2 are configured as said one logical volume, and exposed to a host as said one logical volume, over a plurality of paths including a first path, P1, and a second path, P2, wherein P1 is between the host and DS1, and wherein P2 is between the host and DS2;
    receiving a plurality of I/O operations at the metro cluster configuration directed to the plurality of stretched volumes;
    viewing values of a first metric regarding data replication performed for the plurality of stretched volumes at a plurality of points in time, wherein the data replication is between DS1 and DS2 to replicate write data directed to the plurality of stretched volumes;
    responsive to said viewing, determining whether one or more of the values of the first metric denote that a problem has occurred in the metro cluster configuration at a first of the plurality of points in time;
    responsive to determining that the problem has occurred at the first point in time, performing one or more corrective actions; and
    responsive to determining that the one or more values for the first metric indicate that write data is not being replicated from DS1 to DS2 at corresponding points in time, determining that the one or more values of the first metric are due to a valid configuration change and do not denote an occurrence of the problem in the metro cluster configuration since, at the first point in time, there are no stretched volumes in the metro cluster configuration.

13. A system comprising:
one or more processors; and
one or more memories comprising code stored thereon that, when executed, performs a method of data storage management comprising:
configuring a stretched volume in a metro cluster configuration including a first data storage system, DS1, and a second data storage system, DS2, wherein the stretched volume is configured using a first volume, V1, on DS1 and a second volume, V2, on DS2, wherein V1 and V2 are configured as a same logical volume, L1, and exposed to a host as the same logical volume, L1, over a plurality of paths including a first path, P1, and a second path, P2, wherein P1 is between the host and DS1, and wherein P2 is between the host and DS2;
receiving a plurality of I/O operations at the metro cluster configuration directed to the same logical volume L1, wherein the plurality of I/O operations includes a first plurality of write operations that are received at DS1 and that write first data to V1;
viewing values of one or more metrics a regarding data replication performed for V1 at a plurality of points in time, wherein the data replication is from DS1 to DS2 to replicate the first data written by the first plurality of write operations whereby the replicated first data is subsequently written to V2 on DS2, wherein the one or more metrics include at least one of: an average mirroring overhead latency for V1 indicating latency experienced when performing the data replication that replicates writes directed to V1 from DS1 to DS2, a mirrored write I/O rate denoting a number of write I/O operations in a specified unit of time for write I/Os that are directed to V1 and replicated from DS1 to DS2, and an average mirrored write I/O bandwidth denoting an I/O bandwidth for write data transmitted when replicating write I/Os directed to V1 from DS1 to DS2;
responsive to said viewing, determining whether one or more of the values of the one or more metrics denote that a problem has occurred in the metro cluster configuration at a first of the plurality of points in time; and
responsive to determining that the problem has occurred at the first point in time, performing one or more corrective actions.

14. A non-transitory computer readable medium comprising code stored thereon that, when executed, performs a method of performing data storage management comprising:
configuring a stretched volume in a metro cluster configuration including a first data storage system, DS1, and a second data storage system, DS2, wherein the stretched volume is configured using a first volume, V1, on DS1 and a second volume, V2, on DS2, wherein V1 and V2 are configured as a same logical volume, L1, and exposed to a host as the same logical volume, L1, over a plurality of paths including a first path, P1, and a second path, P2, wherein P1 is between the host and DS1, and wherein P2 is between the host and DS2;
receiving a plurality of I/O operations at the metro cluster configuration directed to the same logical volume L1, wherein the plurality of I/O operations includes a first plurality of write operations that are received at DS1 and that write first data to V1;
viewing values of a first metric regarding data replication performed for V1 at a plurality of points in time, wherein the data replication is from DS1 to DS2 to replicate the first data written by the first plurality of write operations whereby the replicated first data is subsequently written to V2 on DS2;
responsive to said viewing, determining whether one or more of the values of the first metric denote that a problem has occurred in the metro cluster configuration at a first of the plurality of points in time; and
responsive to determining that the problem has occurred at the first point in time, performing one or more corrective actions, wherein at the first point in time, V1 is configured as an unstretched or local resource and not included in the configuration of the stretched volume, and wherein the method further comprises:
responsive to determining that the one or more values for the first metric indicate that write data directed to V1 is not being replicated from DS1 to DS2 at corresponding points in time, determining that the one or more values of the first metric are due to a valid configuration change and do not denote an occurrence of the problem in the metro cluster configuration since, at the first point in time, V1 is unstretched and not included in the configuration for the stretched volume.

15. A system comprising:
one or more processors; and
a memory comprising code stored thereon that, when executed, perform a method of performing data storage management comprising:
configuring a stretched volume in a metro cluster configuration including a first data storage system, DS1, and a second data storage system, DS2, wherein the stretched volume is configured using a first volume, V1, on DS1 and a second volume, V2, on DS2, wherein V1 and V2 are configured as a same logical volume, L1, and exposed to a host as the same logical volume, L1, over a plurality of paths including a first path, P1, and a second path, P2, wherein P1 is between the host and DS1, and wherein P2 is between the host and DS2;
receiving a plurality of I/O operations at the metro cluster configuration directed to the same logical volume L1, wherein the plurality of I/O operations includes a first plurality of write operations that are received at DS1 and that write first data to V1;
viewing values of a first metric regarding data replication performed for V1 at a plurality of points in time, wherein the data replication is from DS1 to DS2 to replicate the first data written by the first plurality of write operations whereby the replicated first data is subsequently written to V2 on DS2;
responsive to said viewing, determining whether one or more of the values of the first metric denote that a problem has occurred in the metro cluster configuration at a first of the plurality of points in time; and
responsive to determining that the problem has occurred at the first point in time, performing one or more corrective actions, wherein at the first point in time, V1 is configured as an unstretched or local resource and not included in the configuration of the stretched volume, and wherein the method further comprises:
responsive to determining that the one or more values for the first metric indicate that write data directed to V1 is not being replicated from DS1 to DS2 at corresponding points in time, determining that the one or more values of the first metric are due to a valid configuration change and do not denote an occurrence of the problem in the metro cluster configuration since, at the first point in time, V1 is unstretched and not included in the configuration for the stretched volume.

16. A method of performing data storage management comprising:
- configuring a plurality of stretched volumes in a metro cluster configuration including a first data storage system, DS1, and a second data storage system, DS2, wherein each stretched volume of the plurality of stretched volumes is configured using a corresponding one of a plurality of volume pairs, wherein each of the plurality of volume pairs for one of the plurality of stretched volumes is configured as one of a plurality of logical volumes, wherein said each volume pair includes a first volume, V1, on DS1 and a second volume, V2, on DS2, wherein V1 and V2 are configured as said one logical volume, and exposed to a host as said one logical volume, over a plurality of paths including a first path, P1, and a second path, P2, wherein P1 is between the host and DS1, and wherein P2 is between the host and DS2;
- receiving a plurality of I/O operations at the metro cluster configuration directed to the plurality of stretched volumes;
- viewing values of a first metric regarding data replication performed for the plurality of stretched volumes at a plurality of points in time, wherein the data replication is between DS1 and DS2 to replicate write data directed to the plurality of stretched volumes;
- responsive to said viewing, determining whether one or more of the values of the first metric denote that a problem has occurred in the metro cluster configuration at a first of the plurality of points in time;
- responsive to determining that the problem has occurred at the first point in time, performing one or more corrective actions; and
- responsive to determining that the one or more values for the first metric indicate that write data is not being replicated from DS1 to DS2 at corresponding points in time, determining that the one or more values of the first metric are due to a valid configuration change and do not denote an occurrence of the problem in the metro cluster configuration since, at the first point in time, there are no stretched volumes in the metro cluster configuration.

17. A system comprising:
- one or more processors; and
- a memory comprising code stored thereon that, when executed, performs a method of performing data storage management comprising:
  - configuring a plurality of stretched volumes in a metro cluster configuration including a first data storage system, DS1, and a second data storage system, DS2, wherein each stretched volume of the plurality of stretched volumes is configured using a corresponding one of a plurality of volume pairs, wherein each of the plurality of volume pairs for one of the plurality of stretched volumes is configured as one of a plurality of logical volumes, wherein said each volume pair includes a first volume, V1, on DS1 and a second volume, V2, on DS2, wherein V1 and V2 are configured as said one logical volume, and exposed to a host as said one logical volume, over a plurality of paths including a first path, P1, and a second path, P2, wherein P1 is between the host and DS1, and wherein P2 is between the host and DS2;
  - receiving a plurality of I/O operations at the metro cluster configuration directed to the plurality of stretched volumes;
  - viewing values of a first metric regarding data replication performed for the plurality of stretched volumes at a plurality of points in time, wherein the data replication is between DS1 and DS2 to replicate write data directed to the plurality of stretched volumes;
  - responsive to said viewing, determining whether one or more of the values of the first metric denote that a problem has occurred in the metro cluster configuration at a first of the plurality of points in time;
  - responsive to determining that the problem has occurred at the first point in time, performing one or more corrective actions; and
  - responsive to determining that the one or more values for the first metric indicate that write data is not being replicated from DS1 to DS2 at corresponding points in time, determining that the one or more values of the first metric are due to a valid configuration change and do not denote an occurrence of the problem in the metro cluster configuration since, at the first point in time, there are no stretched volumes in the metro cluster configuration.

* * * * *